(12) United States Patent
Gibanel et al.

(10) Patent No.: US 12,351,728 B2
(45) Date of Patent: *Jul. 8, 2025

(54) COATING COMPOSITIONS FOR PACKAGING ARTICLES SUCH AS FOOD AND BEVERAGE CONTAINERS

(71) Applicant: SWIMC LLC, Cleveland, OH (US)

(72) Inventors: Sebastien Gibanel, Givry (FR); Benoit Prouvost, Nantes (FR)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,030

(22) Filed: Apr. 18, 2022

(65) Prior Publication Data

US 2022/0315789 A1    Oct. 6, 2022

Related U.S. Application Data

(63) Continuation of application No. 17/003,713, filed on Aug. 26, 2020, now Pat. No. 11,332,636, which is a
(Continued)

(51) Int. Cl.
*C09D 133/08* (2006.01)
*B05D 1/02* (2006.01)
(Continued)

(52) U.S. Cl.
CPC ............ *C09D 133/08* (2013.01); *B05D 7/227* (2013.01); *B65D 5/56* (2013.01); *C08F 2/24* (2013.01);
(Continued)

(58) Field of Classification Search
CPC ........ B05D 7/227; B05D 3/0254; B05D 1/02; B05D 2202/25; B05D 2401/20;
(Continued)

(56) References Cited

U.S. PATENT DOCUMENTS

| | | |
|---|---|---|
| 2,967,162 A | 1/1961 | Vasta |
| 3,248,356 A | 4/1966 | Snyder |

(Continued)

FOREIGN PATENT DOCUMENTS

| | | |
|---|---|---|
| CA | 2066988 | 10/1992 |
| CA | 2758205 A1 | 10/2010 |

(Continued)

OTHER PUBLICATIONS

Fendler and Dékány, Eds., "Nanoparticles in Solids and Solutions," NATO ASI Series, Kluwer Academic Publishers, 1996. Cover page, title page, copyright page, and pp. 265-266.CN.
(Continued)

*Primary Examiner* — Michael C Miggins
(74) *Attorney, Agent, or Firm* — Mueting Raasch Group

(57) ABSTRACT

A method of forming a coating on a food or beverage container, which includes spraying a coating composition onto an interior surface of the food or beverage container, where the coating composition includes an emulsion-polymerized latex copolymer having copolymer chains of one or more mono-unsaturated monomers that are cross-linked with one or more multi-unsaturated monomers. The method also includes heating the sprayed coating composition to cure the coating composition, thereby providing the coating on the interior surface of the food or beverage container.

32 Claims, 2 Drawing Sheets

Related U.S. Application Data continuation of application No. 15/539,366, filed as application No. PCT/US2015/000238 on Dec. 23, 2015, now Pat. No. 10,800,941.

(60) Provisional application No. 62/096,572, filed on Dec. 24, 2014.

(51) Int. Cl.
| | |
|---|---|
| *B05D 3/02* | (2006.01) |
| *B05D 7/22* | (2006.01) |
| *B65D 5/56* | (2006.01) |
| *C08F 2/24* | (2006.01) |
| *C08F 212/08* | (2006.01) |
| *C08F 220/20* | (2006.01) |
| *C09D 125/14* | (2006.01) |
| *C09D 133/02* | (2006.01) |

(52) U.S. Cl.
CPC .......... *C08F 212/08* (2013.01); *C09D 125/14* (2013.01); *C09D 133/02* (2013.01); *B05D 1/02* (2013.01); *B05D 3/0254* (2013.01); *B05D 2202/25* (2013.01); *B05D 2401/20* (2013.01); *C08F 220/20* (2013.01)

(58) Field of Classification Search
CPC .. C09D 133/08; C09D 124/14; C09D 133/02; C08F 212/08; C08F 2/24; C08F 220/20; B65D 5/56
See application file for complete search history.

(56) References Cited

U.S. PATENT DOCUMENTS

| | | |
|---|---|---|
| 3,297,621 A | 1/1967 | Taft |
| 3,390,206 A | 6/1968 | Thompson et al. |
| 3,943,187 A | 3/1976 | Wu |
| 3,991,216 A | 11/1976 | Christenson et al. |
| 4,076,676 A | 2/1978 | Sommerfeld |
| 4,110,291 A | 8/1978 | Barabas et al. |
| 4,129,712 A | 12/1978 | Balatan |
| 4,151,143 A | 4/1979 | Blank et al. |
| 4,199,622 A | 4/1980 | Kokumai et al. |
| 4,247,439 A | 1/1981 | Matthews et al. |
| 4,285,847 A | 8/1981 | Ting |
| 4,289,674 A | 9/1981 | Christenson et al. |
| 4,305,859 A | 12/1981 | McEwan et al. |
| 4,329,401 A | 5/1982 | Talsma et al. |
| 4,413,015 A | 11/1983 | Anderson et al. |
| 4,446,258 A | 5/1984 | Chu et al. |
| 4,487,859 A | 12/1984 | Martino |
| 4,522,961 A | 6/1985 | Martino et al. |
| 4,560,714 A | 12/1985 | Gajria et al. |
| 4,567,246 A | 1/1986 | Gajria et al. |
| 4,647,612 A | 3/1987 | Ranka et al. |
| 4,692,491 A | 9/1987 | Ranka et al. |
| 4,871,810 A | 10/1989 | Saltman |
| 4,894,397 A | 1/1990 | Morgan et al. |
| 4,897,810 A | 1/1990 | Nix |
| 4,898,911 A | 2/1990 | Miyashita et al. |
| 4,906,684 A | 3/1990 | Say |
| 4,948,834 A | 8/1990 | Baker et al. |
| 4,963,602 A | 10/1990 | Patel |
| 4,966,948 A | 10/1990 | Godbey, Jr. |
| 5,043,380 A | 8/1991 | Cole |
| 5,082,742 A | 1/1992 | Padwa |
| 5,157,078 A | 10/1992 | Woo et al. |
| 5,264,469 A | 11/1993 | Mysliwczyk et al. |
| 5,266,628 A | 11/1993 | Essary et al. |
| 5,296,525 A | 3/1994 | Spencer |
| 5,387,625 A | 2/1995 | Parekh et al. |
| 5,527,840 A | 6/1996 | Chutko et al. |
| 5,529,890 A | 6/1996 | McGuckin et al. |
| 5,539,073 A | 7/1996 | Taylor et al. |
| 5,629,376 A | 5/1997 | Sargent et al. |
| 5,686,140 A | 11/1997 | Stoffel |
| 5,714,539 A | 2/1998 | Perez et al. |
| 5,811,484 A | 9/1998 | Wilfinger et al. |
| 5,830,952 A | 11/1998 | Pedersen et al. |
| 5,922,817 A | 7/1999 | Pedersen et al. |
| 5,962,571 A | 10/1999 | Overbeek et al. |
| 6,008,273 A | 12/1999 | Leibelt et al. |
| 6,040,062 A | 3/2000 | McGee et al. |
| 6,197,878 B1 | 3/2001 | Murray et al. |
| 6,388,021 B1 | 5/2002 | Shibata et al. |
| 6,511,756 B1 | 1/2003 | Obuchi et al. |
| 6,852,821 B1 | 2/2005 | Bendix et al. |
| 7,037,584 B2 | 5/2006 | Wind et al. |
| 7,189,787 B2 | 3/2007 | O'Brien et al. |
| 7,303,797 B1 | 12/2007 | Barsotti et al. |
| 7,378,479 B2 | 5/2008 | Tamareselvy et al. |
| 7,592,047 B2 | 9/2009 | O'Brien et al. |
| 7,645,521 B2 | 1/2010 | Wevers et al. |
| 7,682,699 B2 | 3/2010 | Wind et al. |
| 7,858,162 B2 | 12/2010 | Fuhry et al. |
| 7,923,513 B2 | 4/2011 | Killilea et al. |
| 8,092,876 B2 | 1/2012 | O'Brien et al. |
| 8,142,868 B2 | 3/2012 | O'Brien et al. |
| 8,173,265 B2 | 5/2012 | O'Brien et al. |
| 8,367,171 B2 | 2/2013 | Stenson et al. |
| 8,449,960 B2 | 5/2013 | Skillman et al. |
| 8,617,663 B2 | 12/2013 | O'Brien et al. |
| 8,835,012 B2 | 9/2014 | O'Brien et al. |
| 9,029,470 B2 | 5/2015 | Rademacher et al. |
| 9,163,151 B2 | 10/2015 | Lock et al. |
| 9,181,448 B2 | 11/2015 | Li et al. |
| 9,242,763 B2 | 1/2016 | O'Brien et al. |
| 9,394,456 B2 | 7/2016 | Rademacher et al. |
| 9,404,006 B2 | 8/2016 | Li |
| 9,409,219 B2 | 8/2016 | Niederst et al. |
| 9,415,900 B2 | 8/2016 | O'Brien et al. |
| 9,862,854 B2 | 1/2018 | O'Brien et al. |
| 10,538,602 B2 | 1/2020 | Gibanel et al. |
| 10,800,941 B2 | 10/2020 | Gibanel et al. |
| 10,968,288 B2 | 4/2021 | Gibanel et al. |
| 11,059,989 B2 | 7/2021 | DeSousa et al. |
| 11,332,636 B2 | 5/2022 | Gibanel et al. |
| 11,981,822 B2 | 5/2024 | DeSousa |
| 2002/0147270 A1 | 10/2002 | Kuo et al. |
| 2002/0155235 A1 | 10/2002 | Taylor et al. |
| 2002/0161108 A1 | 10/2002 | Schultz et al. |
| 2003/0064185 A1 | 4/2003 | Mazza et al. |
| 2003/0144446 A1 | 7/2003 | Lee |
| 2003/0187128 A1 | 10/2003 | Shiba et al. |
| 2004/0259989 A1 | 12/2004 | 6'Brien et al. |
| 2005/0196629 A1 | 9/2005 | Bariatinsky et al. |
| 2005/0282957 A1 | 12/2005 | Parker et al. |
| 2006/0100366 A1 | 5/2006 | O'Brien et al. |
| 2007/0017440 A1 | 1/2007 | Tang et al. |
| 2007/0036903 A1 | 2/2007 | Mayr et al. |
| 2007/0117928 A1 | 5/2007 | O'Brien et al. |
| 2007/0281179 A1 | 12/2007 | Ambrose et al. |
| 2008/0299343 A1 | 12/2008 | Vogt et al. |
| 2010/0068433 A1 | 3/2010 | Gibanel et al. |
| 2010/0093913 A1 | 4/2010 | Jones et al. |
| 2010/0224510 A1 | 9/2010 | Ford et al. |
| 2010/0260954 A1 | 10/2010 | Stenson et al. |
| 2011/0195263 A1 | 8/2011 | Malotky et al. |
| 2011/0207850 A1 | 8/2011 | Kan et al. |
| 2011/0290696 A1 | 12/2011 | Stenson et al. |
| 2012/0145721 A1 | 6/2012 | Cavallin et al. |
| 2012/0171470 A1 | 7/2012 | Cavallin et al. |
| 2012/0177855 A1 | 7/2012 | Cavallin et al. |
| 2013/0052381 A1 | 2/2013 | Gallucci et al. |
| 2013/0280454 A1* | 10/2013 | Telford ................ C09D 151/00 524/158 |
| 2013/0281574 A1 | 10/2013 | Li |
| 2013/0316109 A1 | 11/2013 | Niederst et al. |
| 2014/0323640 A1 | 10/2014 | Lock et al. |
| 2014/0329954 A1 | 11/2014 | Craun et al. |
| 2015/0017359 A1 | 1/2015 | Singer et al. |
| 2015/0147502 A1 | 5/2015 | Lindenmuth |
| 2015/0218407 A1 | 8/2015 | Bao et al. |

(56) References Cited

U.S. PATENT DOCUMENTS

| | | | |
|---|---|---|---|
| 2015/0225600 A1 | 8/2015 | Cunningham et al. | |
| 2016/0009941 A1 | 1/2016 | Rademacher | |
| 2016/0024325 A1* | 1/2016 | Li | C08F 8/32 |
| | | | 524/247 |
| 2016/0122581 A1 | 5/2016 | You et al. | |
| 2016/0376446 A1 | 12/2016 | Gibanel et al. | |
| 2017/0002227 A1 | 1/2017 | Gibanel et al. | |
| 2017/0009111 A1 | 1/2017 | Bauer et al. | |
| 2017/0369603 A1 | 12/2017 | Gibanel et al. | |
| 2018/0265729 A1 | 9/2018 | Gibanel et al. | |
| 2019/0002724 A1 | 1/2019 | DeSousa et al. | |
| 2019/0249029 A1 | 8/2019 | Gibanel et al. | |
| 2020/0056066 A1 | 2/2020 | Gibanel et al. | |
| 2020/0148795 A1 | 5/2020 | Gibanel et al. | |
| 2020/0148908 A1 | 5/2020 | DeSousa et al. | |
| 2020/0231837 A1 | 7/2020 | Gibanel et al. | |
| 2020/0385601 A1 | 12/2020 | Gibanel et al. | |
| 2020/0392366 A1 | 12/2020 | Gibanel et al. | |
| 2021/0261696 A1 | 8/2021 | Gibanel et al. | |
| 2023/0159783 A1 | 5/2023 | DeSousa et al. | |

FOREIGN PATENT DOCUMENTS

| | | | |
|---|---|---|---|
| CN | 1636043 A | 7/2005 | |
| CN | 1703432 A | 11/2005 | |
| CN | 102712722 A | 10/2012 | |
| CN | 102906144 A | 1/2013 | |
| CN | 103282450 A | 9/2013 | |
| CN | 107690456 A | 5/2016 | |
| CN | 106164113 A | 11/2016 | |
| CN | 107683311 A | 2/2018 | |
| DE | 10225367 | 9/2003 | |
| EP | 0114478 | 8/1984 | |
| EP | 0705852 A1 | 4/1996 | |
| EP | 0 838 537 A1 | 4/1998 | |
| EP | 1371689 | 12/2003 | |
| EP | 1 049 748 B1 | 1/2007 | |
| EP | 1908798 | 4/2008 | |
| EP | 2009034 | 12/2008 | |
| EP | 2033992 | 3/2009 | |
| EP | 3529310 B1 | 12/2021 | |
| GB | 1100569 | 1/1968 | |
| GB | 1555868 | 11/1979 | |
| GB | 1574721 | 9/1980 | |
| GB | 2 287 469 A | 9/1995 | |
| JP | S5216490 B2 | 5/1977 | |
| JP | 5339387 | 4/1978 | |
| JP | 58185604 | 10/1983 | |
| JP | 2-232219 | 9/1990 | |
| JP | H0543830 | 2/1993 | |
| JP | H07-228834 A | 8/1995 | |
| JP | H09-025436 A | 1/1997 | |
| JP | 2000080212 | 3/2000 | |
| JP | 2002138245 | 5/2002 | |
| JP | 2002155234 | 5/2002 | |
| JP | 2004250505 | 9/2004 | |
| JP | 4683515 B2 | 5/2011 | |
| KR | 960010816 A | 4/1996 | |
| RU | 2076109 | 3/1997 | |
| RU | 2133756 | 7/1999 | |
| SU | 653266 | 3/1979 | |
| WO | 89/12618 A1 | 12/1989 | |
| WO | WO9426789 | 11/1994 | |
| WO | WO 97/23516 A1 | 7/1997 | |
| WO | 99/20676 A1 | 4/1999 | |
| WO | 00/12625 A1 | 3/2000 | |
| WO | WO0049072 | 8/2000 | |
| WO | WO0123471 | 4/2001 | |
| WO | WO02064691 | 8/2002 | |
| WO | WO 2003/010254 A2 | 2/2003 | |
| WO | WO2004090020 | 10/2004 | |
| WO | WO2005080517 | 9/2005 | |
| WO | WO2006045017 | 4/2006 | |
| WO | WO2007123659 | 11/2007 | |
| WO | WO2007138111 | 12/2007 | |
| WO | WO2008036629 | 3/2008 | |
| WO | WO2009137014 | 11/2009 | |
| WO | WO2010019180 | 2/2010 | |
| WO | WO 2010/068433 A1 | 6/2010 | |
| WO | WO2010062844 | 6/2010 | |
| WO | WO2010097353 | 9/2010 | |
| WO | WO2010100121 | 9/2010 | |
| WO | WO2010100122 | 9/2010 | |
| WO | WO 2010/118356 A1 | 10/2010 | |
| WO | WO2010114648 | 10/2010 | |
| WO | 2010/125032 A1 | 11/2010 | |
| WO | WO2011009024 | 1/2011 | |
| WO | WO2011011705 | 1/2011 | |
| WO | WO2011011707 | 1/2011 | |
| WO | 2011/057781 A2 | 5/2011 | |
| WO | WO 2011/068930 A1 | 6/2011 | |
| WO | WO 2011/149449 A1 | 12/2011 | |
| WO | WO2012089746 | 7/2012 | |
| WO | WO2012089747 | 7/2012 | |
| WO | WO 2012/108874 A1 | 8/2012 | |
| WO | 2013/098218 A1 | 7/2013 | |
| WO | 2013/191826 A1 | 12/2013 | |
| WO | WO2014089410 | 6/2014 | |
| WO | 2014/139973 A1 | 9/2014 | |
| WO | WO 2014/140057 A1 | 9/2014 | |
| WO | WO2014139971 | 9/2014 | |
| WO | WO2014186285 | 11/2014 | |
| WO | WO2015002958 | 1/2015 | |
| WO | WO2015002961 | 1/2015 | |
| WO | WO2016105502 | 6/2016 | |
| WO | WO2016105504 | 6/2016 | |
| WO | WO2016196174 | 12/2016 | |
| WO | WO2016196190 | 12/2016 | |
| WO | WO2017/112837 A1 | 6/2017 | |
| WO | WO2017180895 A1 | 10/2017 | |
| WO | WO2018013766 | 1/2018 | |
| WO | WO2018075762 A1 | 4/2018 | |
| WO | WO 2018/085052 A9 | 5/2018 | |
| WO | WO 2019/006444 A1 | 1/2019 | |
| WO | WO2019046700 | 3/2019 | |
| WO | WO2019046750 | 3/2019 | |
| WO | WO2018/085052 A1 | 5/2019 | |
| WO | WO 2019/241209 A1 | 12/2019 | |
| WO | 2022/147004 A1 | 7/2022 | |

OTHER PUBLICATIONS

Office Action and Search Report dated Mar. 27, 2019 for Chinese Patent Application No. 201580070922.2, with English translation; 17 pages.

Office Action and Search Report dated Sep. 26, 2019 for Indian Patent Application No. 201717022748; 8 pages.

IPRP and Written Search Report for International Application No. PCT/US2015/000238 dated Jul. 6, 2017.

International Search Report for International Application No. PCT/US2015/000238 dated May 16, 2016.

Thailand Office Action for Thailand Patent Application No. 1701003636 dated Oct. 31, 2017.

Polymerizable Surfactants, Montello Inc., retrieved on Feb. 4, 2015 http://www.montelloinc.com/polymerizable_surfactants2.htm.

English language translation for Japanese Laid-open Publication No. 5339387 (publication date Apr. 11, 1978).

English translation of Chinese OA dated Feb. 7, 2013 for Chinese Application No. CN201080008007.8.

EP Search Report for EP Application No. 15873785.8 dated May 11, 2018.

International Search Report and Written Opinion for International Application No. PCT/EP2010/052174 dated Jun. 15, 2010.

International Preliminary Report on Patentability dated May 30, 2011 for International Application No. PCT/EP2010/052174.

Diehl et al., "Waterborne Mchanical Dispersions of Polyolefins", The Dow Chemical Company, Jan. 24, 2009, pp. 1-14.

International Search Report for PCT/US2016/068180 dated Mar. 21, 2017.

(56) References Cited

OTHER PUBLICATIONS

International Preliminary Report on Patentability for PCT/US2016/068180 dated Jun. 26, 2018.
International Search Report for PCT/US2017/041858 dated Oct. 10, 2017.
International Preliminary Report on Patentability for PCT/US2017/041858 dated Jan. 15, 2019.
International Search Report for PCT/US2018/040546 dated Sep. 19, 2018.
Australian Examination Report No. 1 for Application No. 2015371311 dated Jul. 24, 2019.
International Search Report for PCT/US2015/000236 dated Apr. 10, 2016.
International Preliminary Report on Patentability for PCT/US2015/000236 dated Jun. 27, 2017.
Men'shikova et al., "Synthesis of Carbonxylated Monodisperse Latexes and Their Self-Organization in Thin Films", Russian J. of Applied Chem., vol. 78, No. I (2005), pp. 159-165.
Sigma-Aldrich, "Dioctyl sulfosuccinate sodium salt", Jan. 15, 2019. 4 pages. https://www.sigmaaldrich.com/catalog/product/aldrich/323586?lang=en&region=US.
U.S. National Library of Medicine, Agent Name Docusate sodium, CAS No. 577-11-7. Formula $C_{20}$-$H_{38}$-$O_7$-S.Na. 2 pages. Oct. 2018.
Howard et al., "Dictionary of Chemical Names and Synonyms", Lewis Publishers, © 1992. 3 pages.
POLYSTEP® B-1, Stepan Company retrieved from http://www.stepan.com/products/Surfactants/POLYSTEP%C2%AE/POLYSTEP%C2%AE-B-1.aspx, © 2012.
Stepan, Emulsion Polymerization, Product Bulletin, Nov. 2009.
Mishra et al., "Synthesis and characterization of butyl acrylate/methylmethacrylate/glycidyl methacrylate latexes", J. of Applied Polymer Science., vol. 115 (2010), pp. 549-557. Abstract provided.
Norakankorn et al., "Synthesis of core/shell structure of glycidyl-functionalized poly (methylmethacrylate) latex nanoparticles via a differential microemulsion polymerization", European Polymer J. 45 (2009) pp. 2977-2986. Abstract Provided.
"Specialty Additives Aerosol® Surfactants", 12 pages. Oct. 2013, CYTEC.
"Empimin OP 70", Sodium Di-Octyl Suplhosuccinate 3 pages, Huntsman, Saint-Mihiel, France, (2006).
"Glycosperse® L-20", Polysorbate 20, POE (20) Sorbitan Monolaurate. CAS No. 68154-33-6., 2 pages, LONZA, (2010).
"Glycosperse™ L-20 KFG", Polysorbate 20, POE (Sorbitan Monolaurate), CAS No. 9005-64-5., 2 pages, LONZA, (2013).
"Aerosol® Surfactants—Specialty Additives", Woodland Park, NJ, 12 pages, Cytec Solvay Group, (2015).
Wang et al., "Mechanism of Emulsion Polymerization of Styrene Using a Reactive Surfactant", Journal of Polymer Science Part A: Polymer Chemistry, vol. 39, Issue 18, 3 pages, Wiley Online Library, Sep. 15, 2001.
Fendler et al., "Nanoparticles in Solids and Solutions", NATO ASI Series, Kluwer Academic Publishers, 5 pages. Mar. 8-13, 1996.
BASF Group, "Dihydrodicyclopentadienyl Acrylate (DCPA)" Technical Information TI/CP 1424 e, Petrochemicals Specialty Monomers, Jun. 2016, 2 pages.
Calbo, Ed., Translated by Zhu et al.; "Handbook of Coatings Additives", Shanghai Scientific and Technological Literature Publishing House, May 31, 2000, Cover, title page, publishing information, preface, table of contents, pp. 176-179. Translation provided of relevant text from p. 177.
Chinese Patent Application No. 201880053457.5, Search Report from First Office Action dated Dec. 13, 2021, 5 pages including English translation.
European Patent Application No. 15 87 3784.1, filed Dec. 23, 2015, Extended European Search Report, dated Jul. 19, 2018, 7 pages.
European Patent Application No. 16 88 0072.0, filed Jul. 23, 2018, Supplementary European Search Report, dated Sep. 17, 2019, 6 pages.
Extended European Search Report, Supplementary European Search Report and Search Opinion, dated Mar. 2, 2021, for EP Application No. 18823016.3, 7 pages.
Gu, "The Quality of the Film and Treatments of Inside Spray Coating for Food Can", Dec. 30, 2012, Packaging and Food Machinery, 30(6):67-70. With English Abstract. Translation of Chinese Search Report provided for relevance.
"Guidance for Industry: Preparation of Premarket Submissions for Food Contact Substances (Chemistry Recommendations)," Office of Food Additive and Safety, Food and Drug Administration, Dec. 2007. Online [retrieved Nov. 9, 2020]. Retrieved from the Internet:<URL:https://www.regulations.gov/docket?D=FDA-2013-S-0610>; 23 pgs.
International Standard ASTM D1957-86 (Reapproved 2001), "Standard Test Method for Hydroxyl Value of Fatty Oils and Acids," 3 pages.
International Standard ASTM D1200-88, (1988), "Standard Test Method for Viscosity by Ford Viscosity Cup," 3 pages.
International Standard ASTM D 3359-17, (2017), "Standard Test Methods for Rating Adhesion by Tape Test," 9 pages.
"D1a—Calculations for Selected Examples of D1" (D1 is WO 2012/089746 A1, previously cited), Notice of opposition to a European patent, filed May 30, 2023 in European Patent 3741818, 1 page.
"E1—Viscosity Conversion Table", Other Evidence, Notice of opposition to a European patent, filed May 30, 2023 in European Patent 3741818, 1 page.
European Patent 3741818 granted Aug. 31, 2022 (Application No. EP 20178787.6 filed Jun. 8, 2020), Notice of opposition to a European patent, filed May 30, 2023, Opponent: PPG Industries, Inc., 47 pages.
Summons to Attend Oral Proceedings Pursuant to Rule 115(1)EPC, including summary of facts, consolidated list from the Opposition Division of the European Patent Office for EP Application No. 20178787.6, Jan. 29, 2024; 15 pgs.
Decision to Refuse for EP 16880072.0 issued by the European Patent Office; Jul. 9, 2024;20 pgs.
Minutes from Oral Hearing for EP 16880072.0 issued by the European Patent Office; Jul. 4, 2024; 10 pgs.
European Patent 3529310 granted Dec. 8, 2021 (Application No. EP 17867591.4 filed Oct. 19, 2017), Notice of Opposition to a European patent filed Sep. 5, 2022, Opponent: Akzo Nobel Coatings International B.V., 14 pages.
European Patent 3529310 granted Dec. 8, 2021 (Application No. EP 17867591.4 filed Oct. 19, 2017), Notice of Opposition to a European patent filed Sep. 8, 2022, Opponent: PPG Industries, Inc., 37 pages.
European Patent 3529310 granted Dec. 8, 2021 (Application No. EP 17867591.4 filed Oct. 19, 2017), Consolidated List of References during Opposition, issued Feb. 1, 2023, 1 page.
European Patent No. 3645175 B1, granted on Nov. 23, 2022 (EP Application No. 188230106.3 on Jul. 7, 2018), Notice of Opposition Grounds, Facts, and Arguments, Proprietor: Swimc Llc, Opponent: PPG Industries, Inc., dated Aug. 22, 2023; 18 pgs.
Good, "Chapter 17: Recent Advances in Metal Can Interior Coatings", 1988, Food and Packaging Interactions; Hotchkiss, ed., ACS Symposium Series, American Chemical Society, Washington D.C., 14 pages.
International Standard Astm D4752-10, "Standard Practice for Measuring MEK Resistance of Ethyl Silicate (Inorganic) Zinc-Rich Primers by Solvent Rub1", 2010, 8 pages.
International Preliminary Report on Patentability for International Application No. PCT/US2018/040546 mailed Dec. 31, 2019, 6 pages 0558.001007WO01.
Larrañaga et al., "Hawley's Condensed Chemical Dictionary, Sixteenth Edition", 2016, John Wiley & Sons, Inc., Hoboken, New Jersey, Title pages, copyright page, table of contents, p. 814, and information page.
Lawson, "Waterborne Spray Can Coatings", 1978, Modern Container Coatings, Strand, ed., ACS Symposium Series, American Chemical Society, Washington D.C., 3 pages.
Levy, et al., The Organic Chemistry of Sugars, 2006, Taylor & Francis Group, CRC Press, Title page, copyright p. pp. 227-231.

(56) References Cited

OTHER PUBLICATIONS http://www.montelloinc.com/polymerizable_surfactants2.htm, 3 pages.
Product Guide, "Liquid Coating Resins, Asia Pacific", 2006, Cytec Surfaces Specialties, Inc., 15 pages.
Product Information Bulletin, "Can coatings based on Epikote resins", Sep. 1991, Shell Chemicals, 2 pages.
Product Information Sheet, "Phenolic Crosslinkers Product Guide—Phenodur® Resins—Worldwide", 2017, Allnex GMBH, Frankfurt am Main, Germany, 7 pages.
Stanssens, et al., "On the mechanism of the esterification of a ß-hydroxy alkylamide with a carboxylic acid", 1993, Progress in Organic Coatings, 22:379-391.
White paper, "Overview of Glass Transition Analysis by Differential Scanning Calorimetry (TA443)", TA Instruments. No publication date available, received on Sep. 8, 2022.
"Experimental Report—Experiments based on the opposed patent EP3741818" —(D9)—1 pg. Submitted in EP Opposition for EP 20178787.6 on Aug. 16, 2024.
Interlocutory Decision in Opposition for EP 20178787.6 250 pgs. Nov. 29, 2024.

\* cited by examiner

COATING COMPOSITIONS FOR PACKAGING ARTICLES SUCH AS FOOD AND BEVERAGE CONTAINERS

CROSS-REFERENCE TO RELATED APPLICATIONS

This application is a continuation of U.S. patent application Ser. No. 17/003,713, filed Aug. 26, 2020, which is a continuation of U.S. patent application Ser. No. 15/539,366, filed Jun. 23, 2017, which is the § 371 U.S. National Stage of International Application No. PCT/US2015/000238, filed Dec. 23, 2015, which claims the benefit of U.S. provisional application No. 62/096,572 filed on Dec. 24, 2014 and entitled "COATING COMPOSITIONS FOR PACKAGING ARTICLES SUCH AS FOOD AND BEVERAGE CONTAINERS", all of which are incorporated herein by reference in their entireties.

FIELD

The present disclosure is directed to coating compositions. In particular, the present disclosure is directed to latex emulsion coating compositions, such as for forming coatings (e.g., spray coatings) for food and beverage containers, as well as other packaging articles.

BACKGROUND

A wide variety of coatings have been used to coat the surfaces of packaging articles (e.g., food and beverage cans). For example, metal cans are sometimes coated using "coil coating" or "sheet coating" operations, i.e., a planar coil or sheet of a suitable substrate (e.g., steel or aluminum metal) is costed with a suitable composition and hardened (e.g., cured). The coated substrate then is formed into the can end or body. Alternatively, liquid coating compositions may be applied (e.g., by spraying, dipping, rolling, etc.) to the formed or partially formed article and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, have sufficient flexibility to withstand deflection of the underlying substrate without rupturing (e.g., during fabrication steps and/or damage occurring during transport or use of the packaging article), and resist degradation over long periods of time, even when exposed to harsh environments.

Many current packaging coatings contain mobile or bound bisphenol A ("BPA") or aromatic glycidyl ether compounds, glycidyl methacrylate ("GMA") compounds, or polyvinyl chloride ("PVC") compounds. Although the balance of scientific evidence available to date indicates that the small trace amounts of these compounds that might be released from existing coatings does not pose any health risks to humans, these compounds are nevertheless perceived by some people as being potentially harmful to human health. From the foregoing, it will be appreciated that what is needed in the art is a packaging container (e.g., a food or beverage can or a portion thereof) that is coated with a composition that does not contain extractible quantities of such compounds.

SUMMARY

An aspect of the present disclosure is directed to a method of forming a coating on a packaging article, such as a food or beverage container. The method includes applying a coating composition using any suitable technique to a substrate (typically a metal substrate) prior to or after forming the substrate into a food or beverage container or a portion thereof. The coating composition may be used to form either an exterior coating or an interior coating. The coating composition may be used to form either an exterior coating or an interior coating. The coating composition is preferably prepared from ingredients that do not contain glycidyl acrylate and glycidyl methacrylate in either a mobile or bound form. In a preferred embodiment, the coating composition is substantially free of oxirane-containing compounds, including ingredients prepared from reactants including oxirane-containing compounds.

In a preferred embodiment, the coating composition is spray applied onto an interior surface of a food or beverage container. The coating composition includes an emulsion-polymerized latex copolymer dispersed in an aqueous carrier, where the latex copolymer is preferably a reaction product of monomers that include one or more mono-unsaturated monomers (each having a single ethylenically-unsaturated group), and multi-functional monomers, more preferably one or more one or more multi-unsaturated monomers (each having two or more ethylenically-unsaturated groups).

The multi-unsaturated monomers each preferably have a divalent chain preferably located between at least two of the ethylenically-unsaturated groups, which includes at least two carbon atoms (e.g., $\geq 2$, $\geq 3$, $\geq 4$, $\geq 5$, or $\geq 6$ carbon atoms arranged, e.g., in a linear or branched chain), and preferably constitute more than about 5% by weight (e.g., $\geq 5$ wt-%, $\geq 6$ wt-%, $\geq 7$ wt-%, $\geq 8$ wt-%, $\geq 9$ wt-%, $\geq 10$ wt-%, $\geq 11$ wt-%, $\geq 12$ wt-%, $\geq 13$ wt-%, or $\geq 14$ wt-%) of the monomers used to produce the latex copolymer. In preferred embodiments, the monomers used to produce the latex copolymer are substantially free of oxirane groups.

Another aspect of the present disclosure is directed to a packaging article comprising a food or beverage container, or a portion thereof. In a preferred embodiment, the article includes a metal substrate, and an inside spray coating disposed on at least a portion of the metal substrate, wherein the coating is produced from an inside-spray coating composition having an emulsion-polymerized latex copolymer. The latex copolymer is preferably a reaction product of monomers that include one or more mono-unsaturated monomers and one or more multi-unsaturated monomers.

The multi-unsaturated monomers each preferably have a divalent chain preferably located between at least two of the ethylenically-unsaturated groups, which includes at least two carbon atoms, and constitute more than about 5% by weight of the monomers used to produce the latex copolymer. In a further preferred embodiment, the monomers used to produce the latex copolymer are substantially free of oxirane groups.

Another aspect of the present disclosure is directed to an article comprising a food or beverage container, or a portion thereof, which includes a metal substrate and a coating disposed on at least a portion of the metal substrate, where the coating is produced from an inside-spray coating composition having an aqueous carrier and an emulsion-polymerized latex copolymer. The latex copolymer preferably includes a first copolymer chain and a second copolymer chain each independently having a plurality of polar groups (e.g., hydroxyl groups), a plurality of ester groups, a plurality of water-dispersing groups, and a plurality of cyclic groups, or combinations thereof.

The latex copolymer also preferably includes one or more linkages, each independently having a first end connected to the first copolymer chain with a carbon-carbon bond, a second end connected to the second copolymer chain with a carbon-carbon bond, and an intermediate chain or segment between the first end and the second end. Preferably, the intermediate chain or segment includes two to six carbon atoms, and is substantially free of hydroxyl groups. In additional preferred embodiments, the one or more linkages are formed from one or more multi-unsaturated monomers that constitute more than 5% by weight of monomers used to produce the latex copolymer.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "about" is used herein with respect to measurable values and ranges due to expected variations known to those skilled in the art (e.g., limitations and variabilities in measurements).

The term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

The term "aryl group" (e.g., an arylene group) refers to a closed aromatic ring or ring system such as phenylene, naphthylene, biphenylene, fluorenylene, and indenyl, as well as heteroarylene groups (i.e., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.).

The term "ethylenically-unsaturated group" refers to a carbon-carbon double or triple bond capable of participating in a free-radical initiated emulsion polymerization reaction, and is not intended to encompass the carbon-carbon double bonds present in aryl groups such as, for example, the phenyl group of styrene.

A group that may be the same or different is referred to as being "independently" something.

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The terms "a", "an", "the", "at least one," and "one or more" are used interchangeably. Thus, for example, reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyester is interpreted to include one or more polymer molecules of the polyester, where the polymer molecules may or may not be identical (e.g., different molecular weights, isomers, etc. . . . ).

The term "substantially free" of a particular compound means that the compositions of the present disclosure contain less than 100 parts per million (ppm) of the recited compound. The term "essentially free" of a particular compound means that the compositions of the present disclosure contain less than 10 ppm of the recited compound. The term "essentially completely free" of a particular compound means that the compositions of the present disclosure contain less than 1 ppm of the recited compound. The term "completely free" of a particular compound means that the compositions of the present disclosure contain less than 20 parts per billion (ppb) of the recited compound.

The term "food-contact surface" refers to the substrate surface of a container (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a polymeric coating composition.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

The term "polymer" includes both homopolymers and copolymers (e.g., polymers of two or more different monomers). Similarly, unless otherwise indicated, the use of a term designating a polymer class such as, for example, "acrylic" is intended to include both homopolymers and copolymers (e.g., polyester-acrylic copolymers).

The term "monomer" includes any reactant molecule used to produce a polymer, and encompasses both single-unit molecules (e.g., an acrylic molecule) and multi-unit molecules (e.g., an acrylic oligomer).

The terms "comprises" and variations thereof do not have a limiting meaning where these terms appear in the description and claims.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Figure 1:
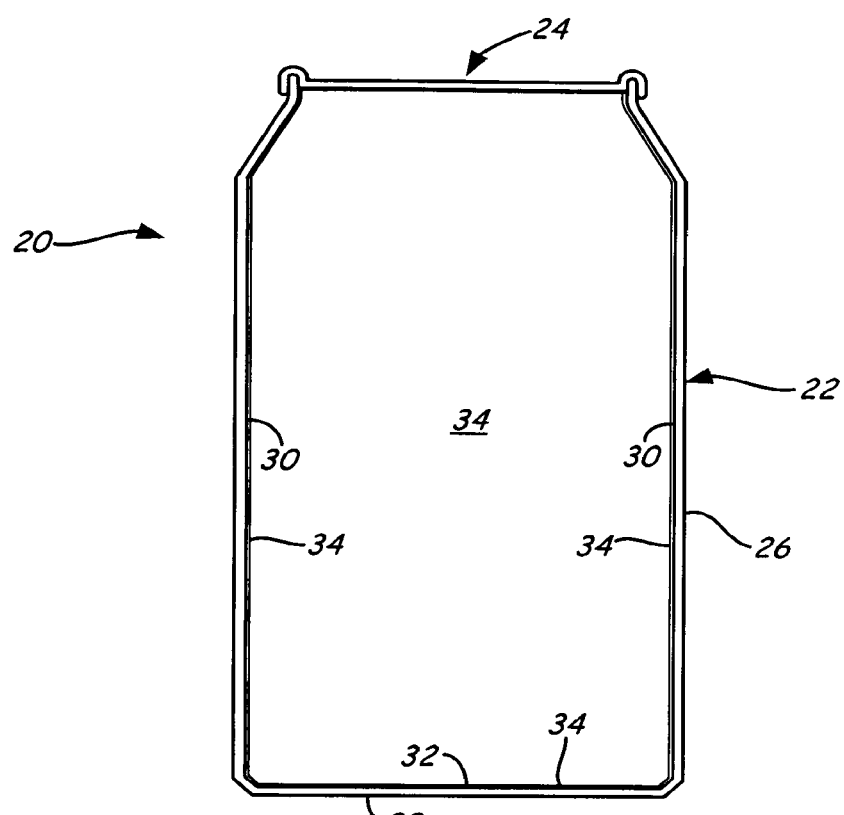
FIG. 1 is a schematic illustration of a two-piece food or beverage container having a coating formed from the coating composition of the present disclosure.

The present disclosure is directed to a coating composition formulated from a latex emulsion that, in preferred embodiments, is substantially free or completely free of glycidyl methacrylate ("GMA"), glycidyl acrylate, and/or other oxirane-group-containing monomers, whether in mobile or bound form (e.g., as a structural constituent of an oligomer or polymer). As discussed below, the coating composition has been found to produce cured coatings with a desirable balance of coating properties, such as good flexibility and pot life stability, as well as good sprayability, flavor scalping resistance, blush resistance, and corrosion resistance. As such, the coating composition is particularly suitable for use in interior food-contact coating applications, including spray coating applications to coat interior surfaces of containers, such as for food and beverage products.

The latex emulsion of the coating composition may include an aqueous carrier and particles of a latex copolymer that is polymerized in one or more emulsion polymerization steps. The latex emulsion may optionally be further formulated and/or modified, such as, for example, for inside-spray coating applications. The resulting coating composition may then be spray applied on an interior metal surface of a formed container (e.g., a food or beverage container). The applied coating composition may then be cured on the interior metal surface to produce a protective interior coating. Alternatively, the coating composition may be applied on an interior or exterior surface using any suitable coating technique (e.g., roll coating, wash coating, dip coating, etc.) prior to or after forming the substrate to be coated into a food or beverage container or a portion thereof.

During the emulsion polymerization to produce the latex copolymer, reactant monomers (and optionally reactant polymers), may be dispersed or otherwise suspended in an aqueous carrier, optionally with the use of one or more external surfactants. The reactant monomers may include a mixture of compounds capable of polymerizing under free radical-initiated, emulsion polymerization conditions, such as monomers having ethylenically-unsaturated groups.

The reactant monomers preferably include (i) one or more mono-unsaturated monomers that each have a single ethylenically-unsaturated group, and (ii) one or more multi-unsaturated monomers that each have two or more ethylenically-unsaturated groups. As used herein, "the total weight of the reactant monomers" refers to the total weight of all monomers that are polymerized to produce the latex copolymer with covalent bonds, including the mono-unsaturated monomers and the multi-unsaturated monomers.

The mono-unsaturated monomers may polymerize with each other (and with the multi-unsaturated monomers) to form copolymer chains, which may be linear and/or branched. The multi-unsaturated monomers may accordingly react with the mono-unsaturated monomers to form interconnecting linkages between the copolymer chains (or as growth sites for the copolymer chains), thereby cross-linking the copolymer chains. The collection of cross-linked polymer chains produce the latex copolymer, which can be provided as a copolymer particle dispersed in the aqueous carrier.

As discussed below, while not wishing to be bound by theory, it is believed that the number of ethylenically-unsaturated groups and the chain characteristics of the multi-unsaturated monomers produce high-molecular-weight, latex copolymers, and participate in increasing the glass transition temperature of the cured coating without detrimentally affecting its deformation performances (e.g., ability to resist coating damage during a drop can event or can fabrication manufacturing step). The high glass transition temperature can be beneficial for flavor scalping resistance of the cured coating.

Moreover, it is believed that the internal cross-linking can prevent the latex copolymer from swelling to an extent that coagulation of the latex emulsion can become an issue, which is beneficial for good pot life stability of the coating composition. Each of the properties can be highly desirable for interior can coating applications, including inside spray-coating applications. Additionally, these properties can be achieved without incorporating GMA and/or other oxirane-group-containing monomers.

Each mono-unsaturated monomer preferably includes an ethylenically-unsaturated group that reacts during the free radical-initiated emulsion polymerization, and at least one additional group configured to form a pendant and/or terminal group of a copolymer chain. Examples of suitable compounds for the mono-unsaturated monomers include (meth)acrylate monomers, ethylenically-unsaturated acid-functional monomers, ethylenically-unsaturated cyclic monomers, other suitable vinyl monomers, polymerizable surfactants, oligomers thereof, and mixtures thereof.

Suitable mono-unsaturated monomers include those having the following structure:

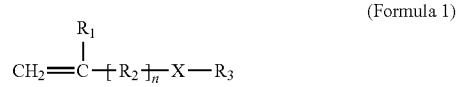

(Formula 1)

where group $R_1$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_1$. Groups $R_2$ and $R_3$ may each independently be any suitable organic group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example.

Group X may be a —COO— ester group or may be omitted. In preferred embodiments, the mono-unsaturated monomers are free of oxirane groups or halogen groups, and more preferably both. The integer "n" may be zero or one, more preferably zero such that group $R_2$ is omitted and the —X—$R_3$ group extends directly from the unsaturated group. In further preferred embodiments, the unsaturated bond (e.g., double bond) is connected to a terminal carbon of the molecule (e.g., a $CH_2$ group), as shown in Formula 1.

Specific examples of suitable (meth)acrylates encompass alkyl (meth)acrylates (including, e.g., cycloaliphatic (meth) acrylates) and aryl (meth)acrylates, which are preferably esters of acrylic or methacrylic acid. Examples of suitable alkyl (meth)acrylates and aryl (meth)acrylates include methyl (meth)acrylate, ethyl (meth)acrylate, propyl (meth) acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth) acrylate, cyclohexyl (meth)acrylate, decyl (meth)acrylate, isodecyl (meth)acrylate, benzyl (meth)acrylate, lauryl (meth)acrylate, isobornyl (meth)acrylate, octyl (meth)acrylate, nonyl (meth)acrylate, hydroxyethyl acrylate, hydroxyethyl methacrylate, hydroxypropyl (meth)acrylate, and mixtures thereof.

The one or more (meth)acrylate monomers may constitute greater than about 10%, more preferably greater than about 20%, and even more preferably greater than about 30% by weight, based on the total weight of the reactant monomers. The (meth)acrylate monomers may also constitute less than about 70%, more preferably less than about 60%, and even more preferably less than about 50% by weight, based on the total weight of the reactant monomers.

Examples of suitable ethylenically-unsaturated acid-functional monomers include ethylenically-unsaturated carboxylic acid monomers, anhydrides thereof, salts thereof, and mixtures thereof. Illustrative ethylenically-unsaturated carboxylic acid monomers include those represented by the following structure:

(Formula 2)

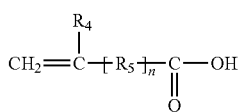

where the group $R_4$ may be a hydrogen atom or an organic group (e.g., —COOH, —CHs, etc.), such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_4$. Group $R_5$ may be any suitable divalent group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example.

In preferred embodiments, the ethylenically-unsaturated acid-functional monomers are free of oxirane groups or halogen groups, and more preferably both. The integer "n" may be zero or one, more preferably zero such that group $R_5$ is omitted and the carboxyl (—COOH) group extends directly from the unsaturated group. In preferred embodiments, the unsaturated bond (e.g., double bond) is connected to a terminal carbon of the molecule (e.g., a $CH_2$ group), as shown in Formula 2.

Examples of suitable ethylenically-unsaturated carboxylic acid monomers include acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, and mixtures thereof. Preferred ethylenically-unsaturated carboxylic acid monomers include acrylic acid, methacrylic acid, crotonic acid, fumaric acid, maleic acid, 2-methyl maleic acid, itaconic acid, 2-methyl itaconic acid, and mixtures thereof.

Examples of suitable ethylenically-unsaturated anhydride monomers include compounds derived from the above-discussed ethylenically-unsaturated carboxylic acid monomers (e.g., as pure anhydride or mixtures of such). Preferred ethylenically-unsaturated anhydrides include acrylic anhydride, methacrylic anhydride, and maleic anhydride. If desired, salts of the above ethylenically-unsaturated carboxylic acid monomers may also be employed.

The ethylenically-unsaturated acid-functional monomers may collectively constitute greater than about 1%, more preferably greater than about 3%, and even more preferably greater than about 5% by weight, based on the total weight of the reactant monomers. The ethylenically-unsaturated acid-functional monomers may also collectively constitute less than about 40%, more preferably less than about 30%, and even more preferably less than about 20%, based on the total weight of the reactant monomers.

Suitable ethylenically-unsaturated cyclic monomers include monomers having cyclic groups and ethylenically-unsaturated groups (e.g., cyclic vinyl monomers), such as one or more ethylenically-unsaturated aromatic monomers, ethylenically-unsaturated alicyclic monomers, and mixtures thereof. Examples of suitable ethylenically-unsaturated aromatic monomers include benzyl(meth)acrylate, styrene, methyl styrene, halostyrene, diallylphthalate, divinylbenzene, alpha-methylstyrene, vinyl toluene, vinyl naphthalene, and mixtures thereof. Styrene is a presently preferred vinyl monomer, in part due to its relatively low cost.

However, in some embodiments, the mono-unsaturated monomers may be substantially free or completely free of styrene. In these embodiments, alternative styrene-offset monomers may be included, such as benzyl (meth)acrylate and/or cyclohexyl (meth)acrylate, such as taught in International Publication No. WO2014/139971. Additional styrene-offset monomers area also disclosed in co-filed U.S. Provisional Patent Application No. 62/096,573, entitled "Styrene-Free Coating Compositions For Packaging Articles Such As Food And Beverage Containers", the contents of which are incorporated by reference as well as the international application filed on the same date herewith that claims priority to the referenced provisional application, which is also incorporated by reference.

Examples of suitable ethylenically-unsaturated alicyclic monomers include vinyl and (meth)acrylate monomers having monocyclic or polycyclic groups, such as inyl and (meth)acrylate monomers of saturated or unsaturated (non-aromatic) cyclic compounds having one or more $C_3$-$C_{10}$ ring structures, which may have divalent linked, fused, bridged, and/or spiro ring arrangements, and where the carbon atoms in the ring structures may be substituted with other atoms, such as oxygen, nitrogen, nitrogen, silicon, sulfur, phosphorus, and the like. Particular examples of suitable examples of ethylenically-unsaturated alicyclic monomers include tetrahydrofurfuryl (meth)acrylate, furfuryl (meth)acrylate, cyclohexyl (meth)acrylate, isobornyl (meth)acrylate, isosorbide (meth)acrylate, mixtures thereof, and the like.

The ethylenically-unsaturated cyclic monomers, when present, may constitute greater than about 10%, more preferably greater than about 20%, and even more preferably greater than about 30% by weight, based on the total weight of the reactant monomers. The ethylenically-unsaturated aromatic monomers may also constitute less than about 70%, more preferably less than about 60%, and even more preferably less than about 50% by weight, based on the total weight of the reactant monomers.

The polymerizable surfactants (and/or other suitable surfactant(s)) may assist in dispersing the reactant monomers in the aqueous carrier, as well as optionally polymerizing with each other and/or the reactant monomers to form the copolymer chains. As such, in some embodiments, the polymerizable surfactants are preferably capable of polymerizing or otherwise reacting under free radical-initiated polymerization conditions. For instance, the polymerizable surfactants may each have one or more hydrophobic portions, one or more hydrophilic portions, and an ethylenically-unsaturated group located at the hydrophobic portion, at the hydrophilic portion, or in-between.

The hydrophobic portion(s) may be any suitable substituted or unsubstituted hydrocarbon chain, such as a substituted or unsubstituted alkyl or alkenyl group, a substituted or unsubstituted cyclic hydrocarbon group, a substituted or unsubstituted aromatic hydrocarbon group, and combinations thereof. The hydrophobic portion(s) preferably include one or more non-polar groups, such as one or more aromatic groups.

The hydrophilic portion(s) may be any suitable substituted or unsubstituted hydrocarbon chain, such as a substituted or unsubstituted alkyl or alkenyl chain, optionally with one or more ether linkages, which terminates in a polar group. The polar group may include one or more hydroxyl groups, acid groups (e.g., carboxylic acid groups), sulfonate groups, sulfinate groups, sulfate groups, phosphate groups, phosphinate groups, phosphonate groups, salt derivatives thereof, and combinations thereof.

Examples of suitable polymerizable surfactants include those disclosed in U.S. Publication No. 2002/0155235; and those commercially available under the tradename "REA-SOAP" from Adeka Corporation, Tokyo, Japan., under the tradenames "NOIGEN" and "HITENOL" from Da-Ichi Kogyo Siyyaku Co., Ltd., Tokyo, Japan; and under the tradename "SIPOMER" from Solvay Rhodia, Brussels, Belgium.

In embodiments that include polymerizable surfactants, the polymerizable surfactants may constitute greater than about 0.1%, more preferably greater than 1%, more preferably greater than about 2%, and even more preferably greater than about 3% by weight, based on the total weight of the reactant monomers. The polymerizable surfactant may also constitute less than about 25%, more preferably less than about 20%, more preferably less than about 15%, and even more preferably less than about 10% by weight, based on the total weight of the reactant monomers. Similar amounts of non-polymerizable conventional low-molecular-weight surfactants may alternatively be used (e.g., amine-neutralized dodecyl benzene sulfonic acid). Mixtures of polymerizable and non-polymerizable surfactants may also be employed.

Although surfactants that are both non-polymerizable and non-polymeric may optionally be used in some embodiments, it is generally preferable to use a polymeric surfactant and/or a polymerizable surfactant to, for example, minimize or eliminate the possibility of surfactant migrating out of the cured coating and into the packaged product.

As briefly mentioned above, the mono-unsaturated monomers can be polymerized to produce monomer units of the copolymer chains for the latex copolymer. In comparison, the multi-unsaturated monomer(s) preferably react during the emulsion polymerization to crosslink the otherwise separate copolymer chains and/or to function as growth sites for adjacent copolymer chains. Examples of suitable compounds for the multi-unsaturated monomers include monomers having two or more ethylenically-unsaturated groups (e.g., 2, 3, or 4), such as multi-functional (meth)acrylate monomers, multi-functional vinyl monomers, multi-functional maleate monomers, and the like. Illustrative multi-unsaturated monomers include those represented by the following structure:

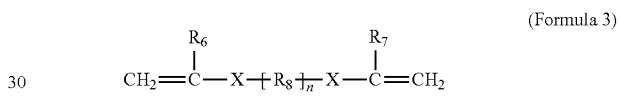

(Formula 3)

where groups $R_6$ and $R_7$ may independently be a hydrogen atom or an organic group, such as a $C_1$-$C_6$ alkyl group, and more preferably a hydrogen atom or a methyl group. Additionally, one or both of the hydrogen atoms attached to the terminal carbon atom of each ethylenically-unsaturated group may independently be replaced with a group $R_6$. Groups X may each independently be a —COO— ester group, may be independently be substituted with an organic group, such as a hydrocarbon group (e.g., for producing an allyl terminal group) or another heteroatom-containing group (e.g., another type of divalent step-growth linkage group), or may be omitted.

Group $R_8$, if present, may be any suitable divalent group, such as, for example, a $C_2$, $C_3$, $C_4$, $C_5$, or $C_6$ hydrocarbon group, where one or more hydrogen atoms of the hydrocarbon group may each optionally be substituted with a group $R_6$, a polar group (e.g., a hydroxy group, an amino group, and the like), and an alkoxy group, for example. In some embodiments, group $R_8$ is selected from a $C_2$, $C_3$, $C_4$, $C_5$, or $C_6$ hydrocarbon moiety. In some embodiments, group $R_8$ may include one or more cyclic groups, which may be saturated, unsaturated, or aromatic, and may be monocyclic or polycyclic groups. While not wishing to be bound by theory, it is believed that in certain preferred embodiments the length of the carbon chain in group $R_8$ may contribute to the good deformation performances of the cured coating, which is desirable for food and beverage container coatings.

In some additional embodiments, one or more hydrogen atoms of the hydrocarbon group in group $R_8$ may also be substituted with a branched ethylenically-unsaturated group, such that the multi-unsaturated monomer may have a total of three or more ethylenically-unsaturated groups. For instance, tri-unsaturated monomers derived from Formula 3 may include those represented by the following structure:

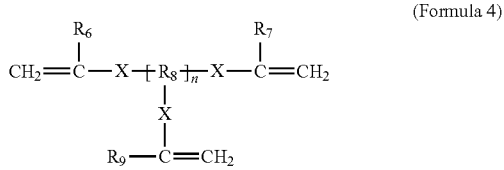

(Formula 4)

where group $R_9$ may independently be a hydrogen atom or an organic group, such as a $C_1$-$C_6$ alkyl group, and more preferably a hydrogen atom or a methyl group. Additionally, one or both of the hydrogen atoms attached to the terminal carbon atom of each ethylenically-unsaturated group may independently be replaced with a group $R_4$. Furthermore, the group X of the branched ethylenically-unsaturated group in the structure of Formula 4 may also be a —COO— ester group, may be independently be substituted with an organic group, such as a hydrocarbon group (e.g., for producing an allyl terminal group) or another heteroatom-containing group (e.g., another type of divalent step-growth linkage group), or may be omitted.

In some preferred embodiments, groups $R_6$, $R_7$, and $R_9$ are substantially free of aromatic groups, such as aryl groups and phenyl groups. In some further preferred embodiments, groups $R_6$, $R_7$, and $R_9$ are substantially free of cyclic groups. In additional preferred embodiments, each unsaturated bond (e.g., double bond) is connected to a terminal carbon of the molecule (e.g., a $CH_2$ group), as shown in Formulas 3 and 4.

In some embodiments, $R^8$ is a linear or branched organic group, more preferably a linear or branched hydrocarbon group, and even more preferably a linear or branched hydrocarbon group free of reactive heteroatom-containing groups (e.g., —OH, —COOH, anhydride, oxirane, —$NH_2$, —NCO, etc.). Examples of preferred such $R^8$ groups include —$(CH_2)_3$—, —$(CH_2)_4$—, —$(CH_2)_5$—, —$(CH_2)_6$—, isomers thereof (e.g., —C(H)($CH_3$)—$CH_2$—$CH_2$—), and variants thereof.

Specific examples of suitable multi-unsaturated (meth) acrylates include polyhydric alcohol esters of acrylic acid or methacrylic acid, such as ethanediol di(meth)acrylate, propanediol di(meth)acrylate, butanediol di(meth)acrylate (e.g., 1,3-butanediol di(meth)acrylate and 1,4-butanediol di(meth) acrylate), heptanediol di(meth)acrylate, hexanediol di(meth) acrylate, trimethylolethane tri(meth)acrylate trimethylolpropane tri(meth)acrylate, trimethylolbutane tri(meth)acrylate, trimethylolheptane tri(meth)acrylate, trimethylolhexane tri (meth)acrylate, tetramethylol methane tetra(meth)acrylate, dipropylene glycol di(meth)acrylate, trimethylol hexane tri (meth)acrylate, pentaerythritol tetra(meth)acrylate, isosorbide di(meth)acrylate, allyl (meth)acrylate, glycerol dimethacrylate, and mixtures thereof.

Examples of multi-unsaturated monomers other than (meth)acrylates include diallyl phthalate, divinylbenzene, divinyltoluene, divinylnaphthalene, and mixtures thereof.

In a preferred embodiment, 1,4-butane diol di(meth) acrylate is used as the multi-unsaturated monomer.

In some embodiments (see, e.g., the latex compositions of the Examples section), the latex copolymer is made using reactants that do not include glycerol dimethacrylate.

In some embodiments, group $R_6$, $R_7$, $R_8$, and/or $R_9$ may form one or more ring structures with one or more of the terminal carbon atoms of the ethylenically-unsaturated groups. These can form ethylenically-unsaturated ring structures, such as norbornene methylolacrylate, dicyclopentadiene, and mixtures thereof, and the like.

The multi-unsaturated monomers constitute greater than about 5%, more preferably greater than about 8%, even more preferably greater than about 9%, and in some embodiments, greater than about 10% (e.g., ≥11%, ≥12%, ≥13%, or ≥14%) by weight of the reactant monomers. The multi-unsaturated monomers may also constitute less than about 25%, more preferably less than about 20% or less than about 17%, and in some embodiments, less than about 15% by weight of the reactant monomers. While not wishing to be bound by theory, it is believed that the concentration of the multi-unsaturated monomers along with the above-discussed monomer chains for the R group crosslinks the copolymer chains in a unique manner.

In particular, it is believed that these crosslinks contribute to a suitably high glass transition temperature which contributes to flavor scalping resistance and corrosion resistance of the cured coating. Additionally, it is believed that these crosslinks contribute to good pot life stabilities of the coating composition, and for durability of the cured coating. In addition, it was surprisingly found that the cured coating was not brittle and exhibited good deformation performances, rendering it particularly beneficial for use as an interior can coating. It was surprisingly discovered that these benefits could be achieved using a relatively "high" concentration of multi-unsaturated monomer that was widely considered to be unsuitable to those of skill in the art. While not intending to be bound by any theory, it is believed that a sufficient amount of multi-unsaturated monomer should preferably be employed to achieve the desired beneficial properties, especially in the absence of glycidyl (meth) acrylate reactants or other oxirane-functional monomers. It is believed that the threshold minimum concentration (expressed as a weight percent) at which such benefits can be achieved will vary depending upon the molecular weight(s) of the particular multi-unsaturated monomer(s) employed. For example, it is believed that a larger weight percent of a higher molecular weight di-unsaturated monomer should be used to achieve a comparable level of internal crosslink formation and comparable performance benefits relative to a lower molecular di-unsaturated weight monomer.

In preferred embodiments, the reactant monomers include a combination of one or more (meth)acrylate monomers, one or more ethylenically-unsaturated acid-functional monomers, one or more ethylenically-unsaturated cyclic monomers, optionally one or more polymerizable surfactants, and one or more multi-unsaturated monomers. A more preferred combination of reactant monomers includes one or more non-aromatic (meth)acrylate monomers, one or more (meth) acrylic acids, one or more vinyl aromatic monomers, optionally one or more polymerizable surfactants, and one or more multi-functional (meth)acrylate monomers.

In this more preferred combination, the non-aromatic (meth)acrylates may constitute from about 20% to about 50% by weight, and more preferably from about 30% to about 40% by weight; the (meth)acrylic acids may constitute from about 1% to about 25% by weight, and more preferably from about 5% to about 15% by weight; the vinyl aromatic monomers may constitute from about 20% to about 50% by weight, and more preferably from about 25% to about 35% by weight; and the optional polymerizable surfactants may constitute from 0% to about 15% by weight, and more preferably from about 5% to about 10% by weight; based on the entire weight of the reactant monomers.

In some aspects, some of the non-aromatic (meth)acrylate monomers may terminate in polar groups, such as hydroxyl groups. In these embodiments, the non-aromatic (meth) acrylate monomers with the terminal polar groups (preferably hydroxyl groups) may constitute from about 1% to about 20% by weight, and more preferably from about 5% to about 15% or about 17% by weight; based on the entire weight of the reactant monomers. The non-aromatic (meth) acrylate monomers without the terminal polar groups may accordingly constitute the remainder of the non-aromatic (meth)acrylate monomers.

Furthermore, the one or more multi-functional (meth) acrylate monomers may constitute from about 5% to about 20% by weight; more preferably from about 9% to about 15% by weight; and in some embodiments from about 10% by weight to about 15% by weight; based on the entire weight of the reactant monomers. In certain such preferred embodiments, the multi-functional (meth)acrylate monomer(s) each preferably have a group $R_8$ (e.g., as shown in Formulas 3 and 4) with a $C_2$-$C_6$ hydrocarbon group, more preferably with a $C_3$-$C_5$ hydrocarbon group, and in some embodiments, with a $C_4$ hydrocarbon group.

The aqueous carrier may include water, and optionally, one or more organic solvents. Examples of suitable organic solvents for use in the aqueous carrier may include methanol, ethanol, isopropyl alcohol, butyl alcohols (e.g., n-butanol and butyl glycol), 2-butoxyethanol, 2-(2-butoxyethoxy) ethanol (i.e., butyl carbitol), aromatic solvents, isophorones, glycol ethers, glycol ether acetates, acetone, methyl-ethyl ketones (MEK), N,N-dimethylformamides, ethylene carbonates, propylene carbonates, diglymes, N-methylpyrrolidones (NMP), ethyl acetates, ethylene diacetates, propylene glycol diacetates, alkyl ethers of ethylene, propylene glycol monoacetates, toluene, xylenes, and combinations thereof.

Optionally, one or more non-polymerizable surfactants may also be used (i.e., alone or in combination with one or more polymerizable surfactants or one or more polymeric surfactant such as, e.g., acrylic polymers having water-dispersing groups such as neutralized acid or base groups), such as surfactants that can support emulsion polymerization reactions. For example, the non-polymerizable surfactant(s) may include surfactants containing sulfonate groups, sulfate groups, phosphate groups, phosphinate groups, phosphonate groups, and combinations thereof; as well as ethoxylated surfactants. An example of a non-polymerizable surfactant includes dodecylbenzene sulfonic acid and sulfonates thereof (e.g., dodecylbenzene sulfonate salts, and particularly amine- or ammonia-neutralized salts).

The concentration of non-polymerizable surfactants may vary depending on the types and concentrations of the reactant components, including the presence of any polymerizable surfactants. In embodiments that include non-polymerizable surfactants, the non-polymerizable surfactants may constitute greater than about 0.01%, greater than about 0.05%, or greater than about 0.1% by weight, relative to a total weight of the reactant components. The non-polymerizable surfactants may also constitute less than about 10%, less than about 7%, or less than about 5% by weight, relative to the total weight of the reactant components.

In some embodiments, a polymeric surfactant(s) having a sufficient amount of water-dispersing groups to facilitate the emulsion polymerization of the reactant monomers may be used to support the emulsion polymerization, either alone or in combination with any of the other types of surfactants referenced herein. Examples of polymer-based surfactants include those disclosed in U.S. Pat. No. 8,092,876, which is incorporated by reference to the extent that it doesn't conflict with the present disclosure. In these embodiments, the polymer surfactants can constitute up to about 40% by solids weight in the aqueous dispersion. Such polymeric surfactants may be acrylic polymers, epoxy polymers, polyester polymers, polyolefin polymers (e.g., (poly)ethylene (meth)acrylic acid copolymers such as, e.g., the PRIMACOR 5980i or PRIMACOR 5990i products), polyurethane polymers, or copolymers or mixtures thereof, with acrylic polymeric surfactants being particularly preferred.

As mentioned above, in preferred embodiments, the reactant components are substantially free or completely free of GMA and glycidyl acrylate. In more preferred embodiments, the reactant components are substantially free or completely free of monomers having oxirane groups. These preferred embodiments may also apply to resulting latex copolymer, the latex emulsion, the coating composition, and the cured coating. As such, in preferred embodiments, the latex copolymer, the latex emulsion, the coating composition, and the cured coating are each also substantially free or completely free of mobile or bound GMA and glycidyl acrylate, and/or monomers or other materials having oxirane groups.

The emulsion polymerization process may be conducted in a variety of manners. In some preferred embodiments, the emulsion polymerization process uses a pre-emulsion monomer mixture in which-some or all of the reactant components and any optional surfactants are dispersed in the aqueous carrier under agitation to form a stable pre-emulsion.

A portion of the surfactants (polymerizable and/or non-polymerizable) and a portion of the aqueous carrier may also be introduced into a reactor, and are preferably heated, agitated, and held under nitrogen sparge to assist in the subsequent polymerization reactions. Preferred temperatures for heating the surfactant dispersion include temperatures greater than about 65° C., and more preferably from about 70° C. to about 90° C.

The pre-emulsion may then be fed to the heated aqueous dispersion in the reactor incrementally or continuously over time. Alternatively, in certain embodiments a batch or semi-batch process may be used to polymerize the reactant monomers in the aqueous dispersion, as described in, for example, U.S. Pat. No. 8,092,876. In further embodiments, the polymerization process can occur in a classic two-stage (or multiple stage) core-shell arrangement. Alternatively, the polymerization process can occur in a multiple stage "inverse core shell" arrangement as discussed in International Publication WO2015/002961. Intermediate hybrids of these processes may also be used.

One or more polymerization initiators may also be added to the aqueous dispersion (e.g., along with the reactant components) at any suitable time(s) to initiate the emulsion polymerization. Suitable polymerization initiators include free-radical initiators, such as one or more peroxides and/or persulfates and similar compounds. Examples of suitable peroxides include hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivalate; peresters such as t-butyl peracetate, t-butyl perphthalate, and t-butyl perbenzoate; as well as percarbonates; and mixtures thereof.

Azoic compounds can also be used to generate free radicals such as 2,2'-azo-bis(isobutyronitrile), 2,2'-azo-bis (2,4-dimethylvaleronitrile), and 1-t-butyl-azocyanocyclohexane, and mixtures thereof. Examples of suitable persulfates include persulfates of ammonium or alkali metal (potassium, sodium or lithium). Perphosphates can be also a source of free radicals, and mixtures thereof.

Polymerization initiators can be used alone or as the oxidizing component of a redox system, which also typically includes a reducing component such as ascorbic acid, malic acid, glycolic acid, oxalic acid, lactic acid, thioglycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, ferrous complexes (e.g., ferrous sulphate heptahydrate), and mixtures thereof. The reducing component is frequently referred to as an accelerator or a catalyst activator.

The initiator and accelerator (if used) are preferably each used in concentrations greater than about 0.001%, more preferably greater than about 0.01%, and more preferably greater than about 0.1% by weight, relative to the total weight of the reactant components. The initiator and accelerator (if used) are also each preferably used in concentrations less than about 5%, more preferably less than about 3%, and in some embodiments, less than about 1% by weight, relative to the total weight of the reactant components.

Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe (II), and ammonium persulfate/sodium bisulfite/sodium hydrosulfite/Fe(II).

The emulsion polymerization may continue for a suitable duration to polymerize the reactant components with a free-radical initiated polymerization process. This can produce each latex copolymer as a particle dispersed or otherwise suspended in the aqueous solution. And, in some embodiments, where each latex copolymer has linear and/or branched copolymer chains that are preferably cross-linked with linkages derived from the multi-unsaturated monomers.

After the polymerization is completed, at least a portion of the carboxylic acid groups and/or anhydride groups of the latex copolymer (or other salt-forming groups such as, e.g., neutralizable base groups) may be neutralized or partially neutralized with a suitable basic compound (or other suitable neutralizing compound) to produce water-dispersing groups. The basic compound used for neutralization is preferably a fugitive base, more preferably a fugitive nitrogen base (e.g., ammonia and primary, secondary, and/or tertiary amines), with amines being particularly preferred.

Some examples of suitable amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Triethyl amine and dimethyl ethanol amine are preferred amines.

The degree of neutralization required may vary considerably depending upon the amount of acid or base groups included in the latex copolymer, and the degree of dispersibility that is desired. In embodiments in which neutralized acid groups are used for water dispersibility, preferred acid numbers for the copolymer prior to neutralization include acid numbers greater than about 40, more preferably greater than about 80, and even more preferably greater than about 100 milligrams (mg) potassium hydroxide (KOH) per gram of the latex copolymer.

Preferred acid numbers for the latex copolymer prior to neutralization also include acid numbers less than about 400, more preferably less than about 350, and even more preferably less than about 300 mg KOH per gram of the latex copolymer. Acid numbers referred to herein may be calculated pursuant to BS EN ISO 3682-1998 standard, or alternatively may be theoretically determined based on the reactant monomers.

Typically, to render the latex copolymer water-dispersible, at least 25% of the acid groups of the latex copolymer are neutralized, preferably at least 30% are neutralized, and more preferably at least 35% are neutralized. Preferably, the latex copolymer includes a sufficient number of water-dispersing groups to form a stable dispersion in the aqueous carrier. Furthermore, in embodiments incorporating polymerizable surfactants and/or other surfactants, the hydrophilic portions of the surfactant may also assist in dispersing the latex copolymer in the aqueous carrier.

While the latex copolymer has been primarily described herein with acid-based water-dispersing groups that are neutralized with basic compounds, in alternative embodiments, the water-dispersing groups may be basic groups that are neutralized with acidic compounds. Examples of suitable basic groups for this embodiment include those disclosed in O'Brien et al., U.S. Pat. No. 8,092,876. Examples of suitable acidic neutralizing compounds include formic acid, acetic acid, hydrochloric acid, sulfuric acid, and mixtures thereof.

After polymerization and/or neutralization, the resulting particles of the latex copolymer are provided in the aqueous carrier as a dispersion of the latex copolymer. In some preferred embodiments, the copolymer chains of the latex copolymer may include one or more ester groups, one or more hydroxyl groups, one or more water-dispersing groups (e.g., carboxylic acid groups, anhydride groups, and/or neutralized salts thereof), and/or one or more cyclic groups (e.g., aromatic groups). Additionally, the copolymer chains may be cross-linked by one or more linkages from the multi-unsaturated monomers to produce the latex copolymer.

For instance, each "cross-link" linkage derived from the multi-unsaturated monomer may include a first end and a second end each connected to an individual copolymer chain with a carbon-carbon bond, and an intermediate chain or segment (linear, branched, and/or ringed) extending between the first end and the second end. In some preferred embodiments, the intermediate chain includes a —COO— ester group extending from each carbon-carbon bond of the first and second ends. In additional preferred embodiments, the intermediate chain includes a group $R_8$ (e.g., as shown in Formulas 3 and 4) between the —COO— ester groups with a $C_2$-$C_6$ hydrocarbon group, more preferably with a $C_3$-$C_5$ hydrocarbon group, and in some embodiments, with a $C_4$ hydrocarbon group. In further preferred embodiments, the intermediate chain is free of hydroxyl groups, which are typical byproducts of oxirane-based reactions.

The coating composition may be formulated from the latex emulsion, optionally with the inclusion of one or more additives and/or by rheological modification for different coating applications (e.g., diluted for spray coating applications). In embodiments in which the coating composition includes one or more additives, the additives preferably do not adversely affect the latex emulsion, or a cured coating formed from the coating composition. For example, such optional additives may be included in the coating composition to enhance composition aesthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow control agents, thixotropic agents, dispersing agents, antioxidants, adhesion promoters, light stabilizers, co-resins and mixtures thereof. Each optional additives is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in an non-volatile amount of no greater than about 3% by weight, and more preferably no greater than about 1% by weight, based on the total solids weight of the coating composition.

Another useful optional ingredient is a lubricant (e.g., a wax), which facilitates manufacture of metal closures and other fabricated coated articles by imparting lubricity to sheets of coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional ingredient is an organosilicon material, such as a siloxane-based and/or polysilicone-based materials. Representative examples of suitable such materials are disclosed in International Publication Nos. WO/2014/089410 and WO/2014/186285.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

The coating composition may also incorporate one or more optional curing agents (e.g., crosslinking resins, sometimes referred to as "crosslinkers"). The choice of particular crosslinker typically depends on the particular product being formulated. For example, some coatings are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of BPA, BPF, BPS, glycidyl ether compounds thereof (e.g., BADGE), and epoxy novolacs.

Any of the well known hydroxyl-reactive curing resins can be used. For example, phenoplast, blocked isocyanates, and aminoplast curing agents may be used, as well as combinations thereof. Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303.

As examples of other generally suitable curing agents are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a number-average molecular weight of at least about 300, more preferably at least about 650, and even more preferably at least about 1,000.

The concentration of the curing agent (e.g., crosslinker) in the coating composition may depend on the type of curing agent, the time and temperature of the bake, and the molecular weights of the copolymer particles. If used, the crosslinker is typically present in an amount of up to about 50% by weight, preferably up to about 30% by weight, and more preferably up to about 15% by weight. If used, the crosslinker is typically present in an amount of at least about 0.1% by weight, more preferably at least about 1% by weight, and even more preferably at least about 1.5% by weight. These weight percentages are based on the total resin solids weight of the coating composition.

In some embodiments, the coating composition may be cured without the use of an external crosslinker (e.g., without phenolic crosslinkers). Additionally, the coating composition may be substantially free of formaldehyde and formaldehyde-conditioning materials, more preferably essentially free of these compounds, even more preferably essentially completely free of these compounds, and most preferably completely free of these compounds.

In preferred embodiments, the coating composition is also substantially free or completely free of any structural units derived from bisphenol A ("BPA"), bisphenol F ("BPF"), bisphenol S ("BPS"), or any diepoxides thereof (e.g., diglycidyl ethers thereof such as the diglycidyl ether of BPA ("BADGE")). In addition, the coating composition is preferably substantially free or completely free of any structural units derived from a dihydric phenol, or other polyhydric phenol, having estrogenic agonist activity great than or equal to that of 4,4'-(propane-2,2-diyl)diphenol. More preferably, the coating composition is substantially free or completely free of any structural units derived from a dihydric phenol, or other polyhydric phenol, having estrogenic agonist activity greater than or equal to that of BPS. In some embodiments, the coating composition is substantially free or completely free of any structural units derived from a bisphenol.

Even more preferably, the coating composition is substantially free or completely free of any structural units derived from a dihydric phenol, or other polyhydric phenol, having estrogenic agonist activity greater than 4,4'-(propane-2,2-diyl)bis(2,6-dibromophenol). Optimally, the coating composition is substantially free or completely free of any structural units derived from a dihydric phenol, or other polyhydric phenol, having estrogenic agonist activity greater than 2,2-bis(4-hydroxyphenyl)propanoic acid. The same is preferably true for any other components of a composition including the coating composition. See, for example, U.S. Publication No. 2013/0316109 for a discussion of such structural units and applicable test methods.

In some further embodiments, the coating composition is substantially free or completely free of any acrylamide-type monomers (e.g., acrylamides or methacrylamide). Moreover, in some embodiments, the coating composition is substantially free or completely free of styrene (whether free or polymerized). As discussed above, in these embodiments, the reactant monomers may include other ethylenically-unsaturated aromatic compounds and/or ethylenically-unsaturated alicyclic compounds, such as aromatic (meth)acrylates and/or alicyclic (meth)acrylates, for example. In additional further embodiments, the coating composition is substantially free or completely free of halogenated monomers (whether free or polymerized), such as chlorinated vinyl monomers.

In some embodiments, the coating composition is preferably free or appreciably free of oils, oil-based materials, and animal fats. Some examples of such materials include vegetable oils (e.g., soy bean oil, canola oil, corn oil, cotton seed oil, linseed oil, sunflower oil, tall oil, and the like) and epoxidized oils (e.g., epoxidized vegetable oils), hydroxyl functional oil graft copolymers (e.g., copolymers formed via reaction of an epoxidized oil and a hydroxyl functional material such as, e.g., propylene glycol, diethylene glycol, neopentyl glycol, and the like). It is believed that the use of unsuitable amounts of such materials may impart undesirable off-tastes or odors to packaged food or beverage products that are kept in prolonged contact with the coating compositions of the present invention. In addition, the presence of unsuitable amounts of such materials may cause the corrosion resistance of coating compositions to be unsuitable for certain end uses, especially for packaging coatings intended for use with so called "hard-to-hold" food or beverage products. In presently preferred embodiments, the coating compositions of the present invention includes, if any, no more than 10 wt-%, more preferably no more than 3 wt-%, and even more preferably no more than 1 wt-% of oils (e.g., vegetable oils) and oil-based materials (e.g., epoxidized vegetable oils and hydroxyl functional vegetable oil graft copolymers).

In a preferred embodiment, the coating composition is substantially free of vegetable oils and vegetable-oil-based materials (e.g., epoxidized vegetable oils and hydroxyl functional vegetable oil graft copolymers).

The coating composition may also optionally be rheologically modified for different coating applications. For example, the coating composition may be diluted with additional amounts of the aqueous carrier to reduce the total solids content in the coating composition. Alternatively, portions of the aqueous carrier may be removed (e.g., evaporated) to increase the total solids content in the coating composition. The final total solids content in the coating composition may vary depending on the particular coating application used (e.g., spray coating), the particular coating use (e.g., for interior can surfaces), the coating thickness, and the like.

In some embodiments, the coating composition preferably has a total solids weight greater than about 5%, more preferably greater than about 10%, and even more preferably greater than about 15%, based on the total weight of the coating composition. The coating composition also preferably has a total solids weight content less than about 80%, more preferably less than about 60%, and even more preferably less than about 50%, based on the total weight of the coating composition. The aqueous carrier may constitute the remainder of the weight of the coating composition.

In some embodiments, such as for certain spray coating applications (e.g., inside spray for food or beverage cans including, e.g., aluminum beverage cans), the coating composition may have a total solids weight greater than about 5%, more preferably greater than about 10%, and even more preferably greater than about 15%, based on the total weight of the coating composition. In these embodiments, the coating composition may also have a total solids weight less than about 40%, more preferably less than about 30%, and even more preferably less than about 25%, based on the total weight of the coating composition. In some of these embodiments, the coating composition may have a total solids weight ranging from about 18% to about 22%. The aqueous carrier may constitute the remainder of the weight of the coating composition.

The coating composition preferably includes at least a film-forming amount of the latex copolymer. In some embodiments, the latex copolymer preferably constitutes greater than about 50%, more preferably greater than about 65%, and even more preferably greater than about 80% by weight of the coating composition, based on the entire weight of the total resin solids in the coating composition. The particles of the latex copolymer may constitute 100% or less, more typically less than about 99%, and even more typically less than about 95% by weight of the coating composition, based on the entire weight of the total resin solids in the coating composition.

If desired, the coating composition may also include one or more other optional polymers in addition to the latex copolymers, such as, for example, one or more acrylic polymers, alkyd polymers, epoxy polymers, polyolefin polymers, polyurethane polymers, polysilicone polymers, polyester polymers, and copolymers and mixtures thereof.

As previously discussed, the aqueous carrier of the coating composition preferably includes water and may further include one or more optional organic solvents. In some embodiments, water constitutes greater than about 20% by weight, more preferably greater than about 35% by weight, and even more preferably greater than about 50% by weight of the total weight of the aqueous carrier. In some embodiments, water constitutes 100% or less, more preferably less than about 95% by weight, and even more preferably less than about 90% by weight of the total weight of the aqueous carrier.

While not intending to be bound by theory, the inclusion of a suitable amount of an organic solvent can be advantageous, in some embodiments (e.g., for certain coil coating applications to modify flow and leveling of the coating composition, control blistering, and maximize the line speed of the coil coater). Accordingly, in certain embodiments, the organic solvents may constitute greater than 0%, more preferably greater than about 5%, and even more preferably greater than about 10% by weight of the aqueous carrier, based on the total weight of the aqueous carrier. In these embodiments, the organic solvents may also constitute less than about 60%, more preferably less than about 50%, and even more preferably less than about 40% by weight of the aqueous carrier, based on the total weight of the aqueous carrier.

The coating composition preferably has a viscosity suitable for a given coating application. In some embodiments, such as for certain spray coating applications (e.g., those discussed below for FIGS. 2 and 3), the coating composition may have an average viscosity greater than about 5 seconds, more preferably greater than 10 seconds, and even more preferably greater than about 15 seconds, based on the Viscosity Test described below (Ford Viscosity Cup #4 at 25° C.). In some embodiments, the coating composition may also have an average viscosity less than about 40 seconds, more preferably less than 30 seconds, and even more preferably less than about 25, based on the Viscosity Test described below.

The coating composition of the present disclosure with the aqueous dispersion of the latex copolymer particles may be applied on a variety of different substrates using a variety of different coating techniques. In preferred embodiments, the coating composition is applied as an inside spray coating. As briefly described above, cured coatings formed from the coating composition are particularly suitable for use on metal food and beverage cans (e.g., two-piece cans, three-piece cans, and the like). Two-piece cans (e.g., two-piece beer or soda cans and certain food cans) are typically manufactured by a drawn and ironing ("D&I") process. The cured coatings are also suitable for use in food or beverage contact situations (collectively referred to herein as "food-contact"), and may be used on the inside or outside of such cans.

For instance, FIG. 1 shows container 20, which is a simplified example of a food or beverage container that may be coated with the coating composition of the present disclosure. Container 20 may be a two-piece can having body 22 and lid piece 24, where body 22 includes sidewall 26 and bottom end 28. Lid piece 24 may be sealed to body 22 in any suitable manner, and may optionally include one or more tabs (not shown) to facilitate peeling off or opening of lid piece 24 or a portion thereof (e.g., as is common for beverage can ends and easy-open food can ends).

Sidewall 26 and bottom end 28 respectively include interior surfaces 30 and 32, and suitable substrate materials for sidewall 26 and bottom end 28 include metallic materials, such as aluminum, iron, tin, steel, copper, and the like. One or more portions of interior surfaces 30 and 32 (or exterior surface) may be coated with coating 34, which is a cured coating formed from the coating composition of the present disclosure. In some embodiments, the interior surface of lid piece 24 may also be coated with coating 34.

Figure 2:
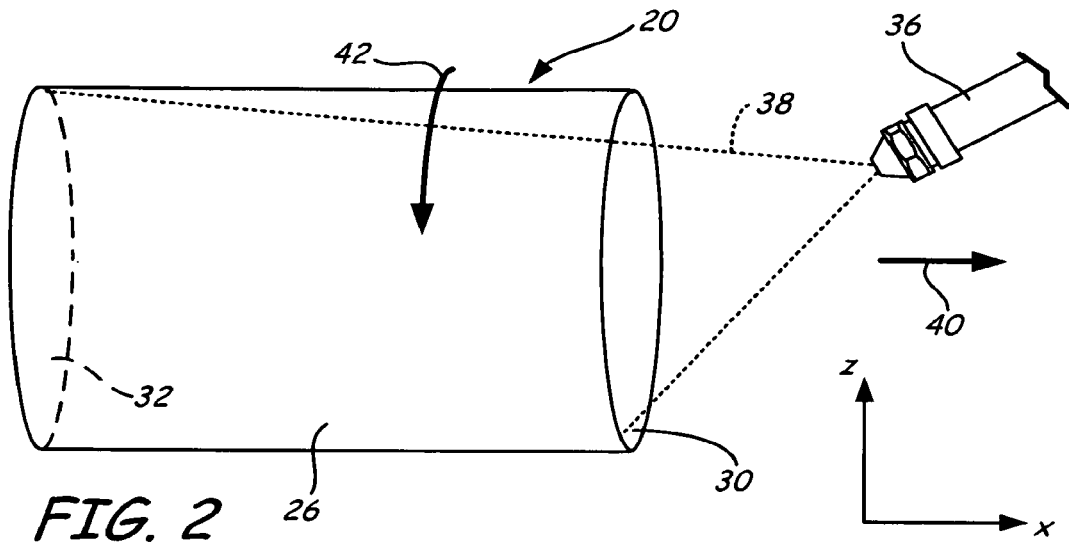
FIG. 2 is a side view of an example spray coating process for spraying the coating composition of the present disclosure onto an interior surface of a can, such as a food or beverage can.
Figure 3:
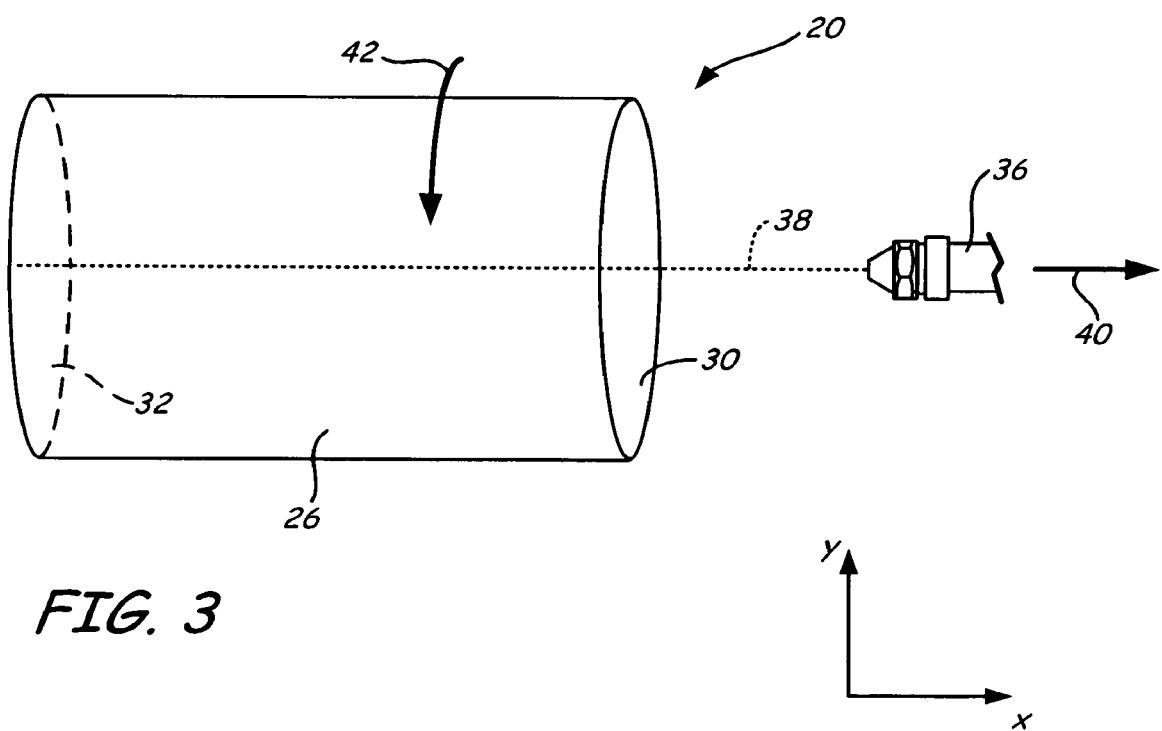
FIG. 3 is a top view of the example spray coating process shown in FIG. 2.

A suitable spray coating technique for applying the coating composition to an interior surface of a food or beverage can (e.g., surfaces 30 and 32) may involve spraying the coating composition using one or more spray nozzles capable of uniformly coating the inside of the can. For example, FIG. 2 illustrates a side view, and FIG. 3 illustrates a top view of an example setup for spray coating the coating composition onto the interior surfaces 30 and 32 of a can 20 with a spray nozzle 36 (prior to necking of an upper portion of sidewall 26). As shown, the spray nozzle 36 is preferably a controlled-pattern nozzle capable of generating a desired spray pattern, such as spray 38 having a flat-fan pattern as generally illustrated in FIGS. 2 and 3.

Furthermore, spray nozzle 36 is preferably stationary, and also preferably generates spray 38 without air pressure (e.g., an airless spray operation). In some embodiments (e.g., in which the can to be sprayed is large), spray nozzle 36 may utilize a "lance spray" technique, where spray nozzle 36 may move relative to the can to reach the far inside end of the can.

In addition, the can 20 itself may be engaged to a rotating mechanism (e.g., a drive roller or belt, and/or a rotatable chuck mount), which is configured to rotate the can 20 at a high speed (e.g., about 2,200 rpm) around its longitudinal axis 40, as illustrated by arrows 42. This rotation of the can 20 preferably spreads the sprayed coating composition evenly across the entire interior surfaces 30 and 32. As can be seen in FIG. 2, the flat-fan pattern of spray 38 is not evenly aligned with the longitudinal axis 40 of the can 20. As such, the pattern of spray 38, as dictated by spray nozzle 36, may be non-homogenous, where the lower portion of spray 38 has a greater density of the coating composition compared to the upper portion of spray 38.

After the spray coating application, each can 20 may be moved to a curing oven to cure the sprayed coating composition, which is preferably performed within about 40 to 200 seconds from the spraying step. The curing process is preferably performed in bulk with multiple cans 20 arranged together on a continuously moving conveyor belt or track. The curing oven preferably heats the cans 20 to a suitable temperature to cure the coating composition, but that is also preferably not too high so as to degrade the coating composition, any other existing coatings on cans 20, and/or the metal materials of cans 20.

Preferred inside spray coating compositions of the present disclosure are capable of being spray applied on an interior of a food or beverage can (e.g., a 2-piece food or beverage can) to effectively, and evenly, coat the substrate and form a continuous cured coating (e.g., a coating that exhibits a suitable initial metal exposure value, thereby indicating that the substrate has been effectively coated).

Suitable curing temperatures for the coating composition of the present disclosure are greater than about 150° C. (about 300° F.), more preferably greater than about 165° C. (about 330° F.), and even more preferably greater than about 180° C. (about 360° F.). In some embodiments, suitable curing temperatures for the coating composition of the present disclosure are also less than about 220° C. (about 430° F.), more preferably less than about 205° C. (about 400° F.), and even more preferably less than about 195° C. (about 380° F.). These temperatures are based on peak metal temperature measurements of the metal walls of the cans 20 as they pass through the curing oven. For example, multiple cans 20 may be grouped together with a test can that is wired with thermocouples to measure the temperatures of one or more portions of the metal walls to ensure the cans 20 are heated enough.

Suitable residence times in the curing oven for the above-discussed temperatures range from about 40 seconds to about three minutes, more preferably about one minute to about two minutes. After curing, the resulting cured coatings (e.g., coating 34) may have suitable film thicknesses for protecting the cans 20 from food or beverage products that are subsequently filled into the cans 20.

The desired film thickness for the cured coating may vary depending on the particular food or beverage to be filled in a given can 20. In some embodiments for the spray coating application (e.g., inside spray for food or beverage cans), the average film thickness after curing is greater than about 0.7 milligrams/square-inch (mg/inch$^2$), more preferably greater than about 0.8 mg/inch$^2$, and even more preferably greater than about 0.9 mg/inch². In these embodiments, the average film thickness after curing is also less than about 4.0 mg/inch², more preferably less than about 3.0 mg/inch², and even more preferably less than about 2.5 mg/inch².

In some further embodiments, the average film thickness after curing ranges from about 0.9 mg/inch² to about 1.1 mg/inch². In other further embodiments, the average film thickness after curing ranges from about 1.4 mg/inch² to about 1.6 mg/inch². In yet other further embodiments, the average film thickness after curing ranges from about 1.9 mg/inch² to about 2.1 mg/inch².

Alternatively, the coating composition may optionally be applied as a coil coating. During a coil coating application, a continuous coil composed of a metal (e.g., steel or aluminum) is coated with the coating composition of the present disclosure. Once coated, the coating coil may be subjected to a short thermal, ultraviolet, and/or electromagnetic curing cycle, for hardening (e.g., drying and curing) of the coating composition. Coil coatings provide coated metal (e.g., steel and/or aluminum) substrates that can be fabricated into formed articles, such as two-piece drawn food cans, food can ends, drawn and ironed cans, beverage can ends, and the like.

The coating composition of the present disclosure also offers utility in other coating applications. These additional applications include, but are not limited to, wash coating, sheet coating, and side seam coatings (e.g., food can side seam coatings). Other commercial coating application and curing methods are also envisioned, for example, electrocoating, extrusion coating, laminating, powder coating, and the like. The coating composition may also be useful in medical or cosmetic packaging applications, including, for example, on surfaces of metered-dose inhalers ("MDIs"), including on drug-contact surfaces.

During the above-discussed curing steps, the aqueous carrier is preferably vaporized or otherwise dried off from the latex copolymer, allowing the copolymer molecules to cure. If desired, the drying and curing steps may be combined in a single step or carried out in separate steps.

Preferred glass transition temperatures for the cured coating include those greater than about 50° C., more preferably greater than about 60° C., even more preferably greater than about 70° C., and in some embodiments, greater than about 80° C. Preferred glass transition temperatures for the cured coating include those less than about 120° C., more preferably less than about 115° C., even more preferably less than about 110° C., and in some embodiments, less than about 100° C. The glass transition temperatures can be measured by dynamic mechanical analysis (DMA) or differential scanning calorimetry (DSC). Some multi-unsaturated monomers typically gel when forming homopolymers, which can limit the effectiveness of theoretical calculations using the Flory-Fox Equation.

To further prevent or otherwise reduce coating penetration by an intended food or beverage product, the cured coating is preferably suitably hydrophobic. For example, the cured coating can have a contact angle with deionized water greater than about 90, more preferably greater than about 95, and even more preferably greater than about 100.

The cured coating preferably exhibits desired properties for use as an inside spray coating for food and beverage containers. For example, the cured coating preferably gives a global extraction of less than about 25 parts-per-million (ppm), and more preferably less than about 10 ppm, and even more preferably less than about 1 ppm, pursuant to the Global Extraction test below. Additionally, the cured coating preferably exhibits a metal exposure less than about 5 milliamps (mA), more preferably less than about 2 mA, and even more preferably less than about 1 mA, pursuant to the Initial Metal Exposure test below.

Flexibility is also important so that the coating can deflect with the metal substrate during post-cure fabrication steps (necking and dome reformation) and if the can is dropped from a reasonable height during transport or use. In some preferred embodiments, the cured coating preferably exhibits a metal exposure less than about 3.5 mA, more preferably less than about 2.5 mA, and even more preferably less than about 1.5 mA, pursuant to the Metal Exposure After Drop Damage test below.

Moreover, the coating composition (uncured) exhibits substantially no change (e.g., a change in viscosity, if any, of less than about 25%, more preferably less than about 15%, even more preferably less than about 10%, and even more preferably less than about 5%) in viscosity pursuant to the Pot Life Stability test below. In addition, after the Pot Life Stability test below, the aged coating composition preferably exhibits an average viscosity when tested pursuant to the Viscosity Test described below of from about 5 seconds to about 40 seconds, more preferably from about 10 seconds to about 30 seconds, and even more preferably from about 15 seconds to about 25 seconds (Ford Viscosity Cup #4 at 25° C.). Accordingly, the coating composition of the present disclosure is particularly suitable for use as an inside spray coating composition for containers configured retain a variety of different food or beverage products.

Property Analysis and Characterization Procedures

Various properties and characteristics of the latex emulsions, coating compositions, and coatings described herein may be evaluated by various testing procedures as described below:

1. Viscosity Test

This test measures the viscosity of a latex emulsion or coating composition for rheological purposes, such as for sprayability and other coating application properties. The test was performed pursuant to ASTM D1200-88 using a Ford Viscosity Cup #4 at 25° C. The results are measured in the units of seconds.

2. Curing Conditions

For beverage inside spray bakes, the curing conditions involve maintaining the temperature measured at the can dome at 188° C. to 210° C. for 60 seconds. For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.). The constructions cited were evaluated by tests as follows.

3. Initial Metal Exposure

This test method determines the amount of the inside surface of the can that has not been effectively coated by the sprayed coating. This determination is made through the use of an electrically conductive solution (1% NaCl in deionized water). The interior "inside spray" coating is typically applied using a high pressure airless spray. The following film weights are typically used: 1.0 msi for a beer can, 1.5 msi for a soda can, and 2.2 msi for a can intended for use in packaging a "hard-to-hold" product.

The coated can is filled with this room-temperature conductive solution, and an electrical probe is attached in contact to the outside of the can (uncoated, electrically conducting). A second probe is immersed in the salt solution in the middle of the inside of the can.

If any uncoated metal is present on the inside of the can, a current is passed between these two probes and registers as a value on an LED display of a suitable measurement apparatus. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 2.0 mA on average.

4. Inside-Spray Performance

This is a performance test for an inside-spray coating. The coated can is immersed in a 10% hydrochloric acid (provided at a 36% concentration)/copper sulphate solution for a 12-hour duration. The corrosion is then rated by measuring the amount corroded and expressed in % of unaltered coating.

5. Can Formation

This is a flexibility test for a coating, and correlates to how an inside-spray coating will withstand a can formation process (e.g., necking steps). In this test, the coated can undergoes a can formation process, including a necking step and bottom dome formation. The formed can is then tested in the electrically conductive solution following the same steps discussed above in the Initial Metal Exposure test.

6. Metal Exposure after Drop Damage

Drop damage resistance measures the ability of the coated container to resist cracks after being in conditions simulating dropping of a filled can. The presence of cracks is measured by passing electrical current via an electrolyte solution, as previously described in the Initial Metal Exposure section. A coated container is filled with the electrolyte solution (1% NaCl in deionized water) and the initial metal exposure is recorded. The electrolyte solution is removed and the can is then filled with room-temperature tap water. For two-piece "inside spray" beverage cans, the film weights described in the Initial Metal Exposure test can be used.

The water-filled can, which does not include a "top" can end, is dropped through a cylindrical tube having a 2 and 7/8 inch internal diameter, can bottom down, onto an impact wedge (e.g., an inclined plane angled upwards at 45 degrees). The impact wedge is positioned relative to the tube such that a dent is formed in the rim area where the can bottom end meets the sidewall (typically referred to as the "chime" of a beverage can). The water-filled can is dropped through the tube from a 24-centimeter height (as measured between the can bottom and the point of impact on the impact wedge) onto an inclined plane, causing a dent in the chime area. The can is then turned 180 degrees, and the process is repeated.

Water is then removed from the can and metal exposure is again measured as described above. If there is no damage, no change in current (mA) will be observed relative to the Initial Metal Exposure value. Typically, an average of 6 or 12 container runs is recorded. The metal exposures results for before and after the drop are reported as absolute values. The lower the milliamp value, the better the resistance of the coating to drop damage. Preferred coatings give metal exposure values after drop damage of less than 3.5 mA, more preferred values of less than 2.5 mA, and even more preferred values of less than 1.5 mA.

7. Adhesion

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure (best), a rating of "9" indicates 90% of the coating remains adhered, a rating of "8" indicates 80% of the coating remains adhered, and so on. Adhesion ratings of 10 are typically desired for commercially viable coatings.

8. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "10" indicates no blush (best) and a rating of "0" indicates complete whitening of the film (worst). Blush ratings of 7 or higher are typically desired for commercially viable coatings, and optimally 9-10.

9. Corrosion Resistance

These tests measure the ability of a coating to resist attack by solutions of different levels of aggressiveness. Briefly, a given coating is subjected to a particular solution, as described below, and then measured for adhesion and blush resistance, each also described below. For each test, a result is given using a scale of 0-10, based on the Adhesion Resistance, Blush Resistance, and/or Bush Adhesion Resistance, where a rating of "10" is best and a rating of "0 is worst.

A. Deionized Water

Deionized water is heated to 82° C. Coated panels are immersed in the heated solution for 30 minutes and then removed, rinsed, and dried. Samples are then evaluated for adhesion and blush, as previously described.

B. Acetic Acid Solution

A 3% solution of acetic acid ($C_2H_4O_2$) in deionized water is prepared and heated to 100° C. Coated panels are immersed in the heated solution for 30 minutes and then removed, rinsed, and dried. Samples are then evaluated for adhesion and blush, as previously described.

C. Citric Acid Solution

A 2% solution of citric acid ($C_6H_8O_7$) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

D. Cider Solution

A cider solution of 32.4 grams/liter malic acid. 9.6 grams/liter lactic acid, 12.9 grams/liter acetic acid, and 125 milligrams/liter sodium sulfite is prepared and heated to 40° C. Coated panels are immersed in the heated solution for 24 hours and then removed, rinsed, and dried. Samples are then evaluated for adhesion and blush, as previously described.

10. Pasteurization

The pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in either a deionized water bath for 45 minutes at 85° C., or a 3% solution of acetic acid ($C_2H_4O_2$) in deionized water for 30 minutes to 100° C. Coated panels are immersed in the heated solution for 30. The coated substrate was then removed from the bath and tested for coating adhesion and blush as described above. Commercially viable coatings preferably provide adequate pasteurization resistance with perfect adhesion (rating of 10) and blush ratings of 5 or more, optimally 9-10.

11. Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Pasteurization test. Testing is accomplished by subjecting the substrate to heat ranging from 105-130° C. and pressure ranging from 0.7 to 1.05 kilograms/square-centimeter for a period of 15 to 90 minutes.

For the present evaluation, the coated substrate is immersed in a 2% solution of citric acid ($C_6H_8O_7$) in deionized water (the above-discussed Citric Acid Solution), and subjected to heat of 121° C. (250° F.) and pressure of 1.05 kilograms/square-centimeter for a period of 90 minutes. The coated substrate is then tested for adhesion and blush as described above. In food or beverage applications requiring retort performance, adhesion ratings of 0 and blush ratings of 3 or less are typically desired for commercially viable coatings.

12. Solvent Resistance

The extent of cure or crosslinking of a coating is measured as a resistance to methyl ethyl ketone (MEK, available from Exxon, Newark, N.J.). This test is performed as described in ASTM D 5402-93. The number of double-rubs (i.e., one back- and forth motion) is reported.

13. Pot Life Stability

The pot life stability of a coating composition is measured by initially measuring its viscosity, and then storing the coating composition at 40° C. for one month. After the one-month period, the viscosity of the aged coating composition is measured and compared to the initial viscosity measurement. Substantially no change in viscosity (e.g., a change in viscosity, if any, of less than about 25%, more preferably less than about 15%, even more preferably less than about 10%, and even more preferably less than about 5%) indicates that the coating composition has a good pot life stability. In comparison, a significant increase in viscosity (e.g., gelation) indicates that the coating composition has poor pot life stability.

14. Glass Transition Temperature

Samples for differential scanning calorimetry ("DSC") testing may be prepared by first applying the liquid resin composition onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

15. Global Extraction

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure used in the current invention is described in 21 CFR § 175.300 paragraph (e)(4)(xv) with the following modifications to ensure worst-case scenario performance: (1) the alcohol (ethanol) content was increased to 10% by weight, and (2) the filled containers were held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values were calculated based on surface area of the can (no end) of 44 square inches with a volume of 355 milliliters. Preferred coatings give global extraction results of less than 50 ppm, more preferred results of less than 10 ppm, even more preferred results of less than 1 ppm. Most preferably, the global extraction results are optimally non-detectable.

EXAMPLES

The present disclosure is more particularly described in the following examples that are intended as illustrations only, since numerous modifications and variations within the scope of the present disclosure will be apparent to those skilled in the art. The following Table 1 lists some of the raw materials used in the following examples. Alternative materials or suppliers may be substituted as is appreciated to one skilled in the art.

TABLE 1

| Raw Material | Supplier |
|---|---|
| Polymerizable Surfactant | "REASOAP SR1025" from Adeka Corporation, Tokyo, Japan |
| Styrene | Rohm & Haas, Philadelphia, PA |
| Ethyl Acrylate | Rohm & Haas, Philadelphia, PA |
| Acrylic Acid | Rohm & Haas, Philadelphia, PA |
| Hydroxyethyl Methacrylate | Rohm & Haas, Philadelphia, PA |
| 1,4-Butanediol Dimethacrylate (BDDMA) | |
| 1,6-Hexanediol Dimethacrylate (HDDMA) | |
| Ethylene Glycol Dimethylacrylate (EGDMA) | |
| Ammonium Persulphate | Sigma-Aldrich Co. LLC, St. Louis, MO |

Coating Compositions CC1-CC5

A coating composition CC) was prepared using the following emulsion-polymerization process. A monomer premix of 559 parts styrene, 500 parts ethyl acetate, 160 parts acrylic acid, 145 parts hydroxyethyl methacrylate, and 242 parts 1,4-butanediol dimethacrylate (BDDMA) was initially prepared under agitation and room temperature.

A pre-emulsion was also prepared, which initially included 97.6 parts of the polymerizable surfactant and 289.5 parts deionized water, which were slowly agitated to avoid foam formation. Once homogenous (after about 5 minutes), the monomer premix was added under vigorous agitation until reaching a stable pre-emulsion. The pre-emulsion was then held under the vigorous agitation for 45 minutes.

17.2 parts of the polymerizable surfactant and 1,850 parts deionized water also added to a glass reactor vessel, which was held under agitation with nitrogen sparge, and heated to 80° C. Upon reaching this temperature, the pre-emulsion was metered into the reactor vessel over a period of three hours. Fifteen minutes into the pre-emulsion metering, an initiator premix of 2.8 parts ammonium persulfate and 205 parts water were metered into the reactor vessel (through a separate line) over a period of 210 minutes.

After the metering of the pre-emulsion and initiator premix, each line was flushed with deionized water (200 parts total), and the reactor vessel was then held under agitation at 80° C. for an additional two hours. After the polymerization was completed, the reactor vessel was slowly cooled down and filtered to collect the resulting latex emulsion, where no coagulum was visibly observable. The resulting latex emulsion was then diluted with a solution of deionized water and organic solvents to reach a viscosity between 15 and 25 seconds based on the Viscosity Test, and 6% by weight of a crosslinker was added (based on total solids weight).

Coating compositions CC2-CC5 were prepared using the same above-discussed steps and materials used for coating composition CC1, where the concentrations of the BDDMA were varied between 4% and 15% by weight of the reactant monomers (not including the polymerizable surfactant), and the concentrations of styrene were varied to adjust the glass transition temperatures of the resulting cured coatings. Table 2 lists the concentrations of the reactant monomers (not including the polymerizable surfactant) for the coating compositions CC1-CC5.

TABLE 2

| | Component | | | | |
|---|---|---|---|---|---|
| | CC1 | CC2 | CC3 | CC4 | CC5 |
| Styrene | 34.8 | 41.2 | 40.5 | 46.5 | 39.3 |
| Ethyl Acrylate | 31.1 | 24.9 | 29.8 | 28.1 | 35.2 |
| Acrylic Acid | 10.0 | 9.9 | 10.6 | 11.2 | 11.3 |
| Hydroxyethyl Methacrylate | 9.0 | 9.0 | 9.6 | 10.2 | 10.2 |
| BDDMA | 15.1 | 15.0 | 9.5 | 4.0 | 4.1 |

Coating evaluations were performed on flat aluminum panels and sprayed aluminum cans. For the panels, each coating composition was applied to flat aluminum panels with an applied coating thickness of 4 grams/square-meter. Each applied coating composition was then cured on the panel for 60 seconds at a temperature of 193° C. to produce cured coatings.

For the spray can applications, each coating composition was sprayed into interior surfaces of aluminum cans with 120-140 milligrams/can. Each applied coating composition was then cured on the can for 210 seconds with one minute at a temperature of 193° C. (peak metal temperature (PMC)).

The coatings were then evaluated for use as internal surface-coatings for two-piece beverage cans. Table 3 lists the results of the tests performed for the cured coatings of coating compositions CC1-CC5 and a control coating composition. The control coating composition included a latex emulsion produced with epoxy-containing monomers, and is considered a high-end coating composition.

TABLE 3

| Test Performed | CC1 | CC2 | CC3 | CC4 | CC5 | Epoxy Control |
|---|---|---|---|---|---|---|
| BDDMA (Percent by Weight)[1] | 15.1 | 15.0 | 9.5 | 4.0 | 4.1 | — |
| Glass Transition Temperature (° C.) | 84.7 | 97.2 | 82.7 | 78.8 | 71.6 | 103.0 |
| Inside-Spray Performance | 72% | 35% | 41% | 55% | 85% | 91% |
| Can Formation | 0.5 mA | 1.5 mA | 0.4 mA | 0.1 mA | 0.2 mA | 0.2 mA |
| Metal Exposure after Drop Damage | 1.2 mA | 4.7 mA | 1.7 mA | 1.4 mA | 2.2 mA | 1.0 mA |
| Scalping Resistance | 3% | 3% | 3% | 3% | 4% | 2% |
| Pot Life Stability | Good[2] | Good | Poor | Poor | Poor | Good |

[1]Percent of weight based on total weight of reactant monomers except the polymerizable surfactant.
[2]After 1 month in a 40° C. hot box, the viscosity of CC1 increased by about 10% and the viscosity was still within the suitable range for inside spray application. In a more sensitive viscosity test using an ASTM Ford Cup 2 at 25° C., the average viscosity of CC1 was 49 seconds after 1 month in the 40° C. hot box, whereas the initial with a ASTM Ford Cup 2 was 44 seconds.

The data of Table 3 was intended primarily as a design-of-experiment to gain a better understanding of the effects of BDDMA concentration on pot life stability. As shown in Table 3, those latexes including 9.5 wt-% or less of BDDMA (i.e., CC3-CC5) exhibited poor pot life stability, whereas CC1 and CC2 exhibited good pot-life stability. With respect to inside-spray performance, while 72% for CC1 was a decent level of performance, especially given that the design-of-experiment was directed primarily to pot life stability, it is believed the inside-spray performance of some of the lesser performing systems in Table 3 could be improved, for example, through modifying the solvent system employed.

Table 4 lists the results of additional tests performed for the cured coatings of coating composition CC1 and the control coating composition.

TABLE 4

| Test Performed | CC1 | Epoxy Control |
|---|---|---|
| Initial Metal Exposure | 0.2 mA | 0.1 mA |
| Coating Resistance (Cider Solution) | 6/10 | 10/10 |
| Pasteurization (Deionized Water) | 10/10 | 10/10 |
| Pasteurization (Acetic Acid) | 6/10 | 10/10 |
| Retort Resistance (Citric Acid) | 8/10 | 10/10 |
| Solvent Resistance | >100 | >100 |

Coating Compositions CC6-CC9

Coating compositions CC6-CC9 were prepared using the same above-discussed steps and materials used for coating composition CC1, where BDDMA was replaced with HDDMA and EGDMA. Coating compositions CC6 and CC8 were the same as coating composition CC1, except that BDDMA was respectively replaced with HDDMA and EGDMA (same weight concentrations). In comparison, coating compositions CC7 and CC9 respectively included HDDMA and EGDMA, but were based on the same number molar concentrations (rather than weight concentrations). Table 5 lists the concentrations of the reactant monomers (not including the polymerizable surfactant) for the coating compositions CC6-CC9.

TABLE 5

| | Component | | | |
|---|---|---|---|---|
| | CC6 | CC7 | CC8 | CC9 |
| Styrene | 34.8 | 34.2 | 34.8 | 35.5 |
| Ethyl Acrylate | 31.1 | 30.6 | 31.1 | 31.7 |
| Acrylic Acid | 10.0 | 9.8 | 10.0 | 10.2 |
| Hydroxyethyl Methacrylate | 9.0 | 8.9 | 9.0 | 9.2 |
| HDDMA | 15.1 | 16.6 | 0.0 | 0.0 |
| EGDMA | 0.0 | 0.0 | 15.1 | 13.5 |

Table 6 below lists the tests performed for the cured coatings of coating compositions CC6-CC9.
Coating Compositions CC10-CC11.

TABLE 6

| Test Performed | CC6 | CC7 | CC8 | CC9 |
|---|---|---|---|---|
| Multi-Ethylenically Unsaturated Monomer | HDDMA (Percent by weight) 15.1 | HDDMA (Percent by mole) 16.6 | EGDMA (Percent by weight) 15.1 | EGDMA (Percent by mole) 13.1 |
| CuSO4 Corrosion (% good) | 84% | 91% | 38% | 61% |
| Initial porosity(mA) | 0.2 | 0.2 | 17.1 | 4.7 |
| Metal Exposure after Drop Damage (mA) | 2.5 | 1.6 | 38.4 | 18.5 |
| Pot life stability | Poor | Poor | Good | Good |

Coating compositions CC10 and CC11 were prepared used the above-discussed steps and materials used for coating compositions CC1, with the exception that (i) the indicated concentration of BDDMA in Table 7 was used and (ii) a different surfactant package was used (i.e., a combination of dioctyl sodium sulfosuccinate and TWEEN 20 surfactants). This different surfactant package, however, has been successfully used to produce a 15% BDDMA latex similar to composition CC0 that exhibited good pot life stability and good other coating properties (data not shown in Table 7).

TABLE 7

| Test Performed | CC10 | CC11 | CC1 |
|---|---|---|---|
| BDDMA (Percent by weight)[1] | 7% | 12% | 15% |
| Initial porosity(mA) | 0.1 | 0.1 | 0.2 |
| Metal Exposure after Drop Damage (mA) | 17.52 | 7.5 | 1.7 |
| Pot life stability | Poor | Poor | Good |

As can be seen from the data of Table 7, the CC10 and CC11 latexes exhibited poor pot life stability. With respect to the CC11 latex, it is believed that the pot life stability could be improved, and likely sufficiently improved to qualify as a "good" rating, had REASOAP SR1025 surfactant instead been used as the surfactant to make the latex. While not intending to be bound by any theory, it is believed that the substitution of REASOAP SR1025 surfactant in the process used to make the CC10 latex would not have been sufficient to improve the pot life stability to qualify as a "good" rating.

The complete disclosures of the patents, patent documents, and publications cited herein are incorporated by reference to the extent that they do not conflict with the present disclosure. Although the present disclosure has been described with reference to preferred embodiments, workers skilled in the art will recognize that changes may be made in form and detail without departing from the spirit and scope of the disclosure.

The invention claimed is:

1. An inside spray coating composition comprising:
an aqueous carrier; and
greater than about 65 weight percent, based on the entire weight of the total resin solids in the coating composition, of an emulsion-polymerized latex copolymer comprising:
one or more mono-unsaturated monomers each having a single ethylenically-unsaturated group; and
one or more multi-unsaturated monomers each having two or more ethylenically-unsaturated groups, wherein the multi-unsaturated monomer(s) each have a divalent chain length with at least two carbon atoms between at least two of the ethylenically-unsaturated groups, and constitute from greater than 5% by weight to 25% by weight of the monomers used to produce the emulsion-polymerized latex copolymer;
wherein:
the average viscosity of the coating composition ranges from about 5 seconds to about 40 seconds using a Ford Viscosity Cup #4 at 25° C.;
a coating formed from the coating composition has a glass transition temperature greater than about 50° C. and exhibits a metal exposure of less than 3.5 milliamps, pursuant to the Metal Exposure After Drop Damage test and a global extraction of less than 50 parts-per-million, pursuant to the Global Extraction test;
wherein the coating composition comprises a curing agent, wherein the curing agent is a crosslinker, which is present in an amount of up to 15% by weight, based on the total resin solids weight of the coating composition; and
wherein the inside spray coating composition is an inside beverage container coating composition.

2. The coating composition of claim 1, wherein the coating composition includes no more than 3 wt-% of oils and oil-based materials.

3. The coating composition of claim 1, wherein the curing agent is a phenoplast, a blocked isocyanate, an aminoplast, or a combination thereof.

4. The coating composition of claim 1, wherein the one or more multi-unsaturated monomers comprise one or more multi-unsaturated (meth) acrylate monomers, and wherein one or more of the following is true:
the coating composition is substantially free of formaldehyde and formaldehyde-containing compounds;
the coating composition is substantially free of styrene, whether free or polymerized;
the coating composition is substantially free of acrylamide-type monomers; and
the coating composition is substantially free of halogenated monomers, whether free or polymerized.

5. The coating composition of claim 4, wherein the coating composition is substantially free of formaldehyde and formaldehyde-containing compounds.

6. The coating composition of claim 4, wherein the monomers used to produce the emulsion-polymerized latex copolymer are substantially free of oxirane groups.

7. The coating composition of claim 4, wherein the coating composition is substantially free of styrene, whether free or polymerized.

8. The coating composition of claim 7, wherein the one or more mono-unsaturated monomers comprise an alicyclic monomer.

9. The coating composition of claim 8, wherein the alicyclic monomer comprises tetrahydrofurfuryl (meth) acrylate, furfuryl (meth) acrylate, cyclohexyl (meth) acrylate, isobornyl (meth) acrylate, isosorbide (meth) acrylate, and mixtures thereof.

10. The coating composition of claim 4, wherein the one or more mono-unsaturated monomers comprise one or more polymerizable surfactants.

11. The coating composition of claim 4, wherein the emulsion-polymerized latex copolymer is emulsion polymerized in the presence of a polymeric surfactant, and wherein the polymeric surfactant is present in an amount up to about 40% by solids weight in the coating composition.

12. The coating composition of claim 4, wherein the emulsion-polymerized latex copolymer is emulsion polymerized in the presence of a polymeric surfactant comprising an acrylic polymer, an epoxy polymer, a polyester polymer, a polyolefin polymer, or a copolymer or mixture thereof.

13. The coating composition of claim 4, wherein the emulsion-polymerized latex copolymer is emulsion polymerized in the presence of a (poly) ethylene (meth) acrylic acid copolymer.

14. The coating composition of claim 4, wherein the one or more multi-unsaturated (meth) acrylate monomers comprise 1,4-butanediol di (meth) acrylate, and wherein 1,4-butanediol di (meth) acrylate constitutes from 8% by weight to 25% by weight of the emulsion-polymerized latex copolymer, based on the total weight of the monomers used to produce the emulsion-polymerized latex copolymer.

15. The coating composition of claim 4, wherein the concentration of the one or more multi-unsaturated (meth) acrylate monomers ranges from 8% by weight to 20% by weight, based on the total weight of the monomers used to produce the emulsion-polymerized latex copolymer.

16. The coating composition of claim 4, wherein the coating composition exhibits substantially no change in viscosity pursuant to the Pot Life Stability test.

17. The coating composition of claim 4, wherein a coating formed from the coating composition has a glass transition temperature greater than about 60° C. to less than about 115° C.

18. The coating composition of claim 17, wherein a coating formed from the coating composition has a glass transition temperature greater than about 70° C. to less than about 115° C.

19. The coating composition of claim 18, wherein the latex copolymer constitutes greater than about 80% by weight of the coating composition, and wherein the coating composition:
has a total solids weight of greater than about 10% to less than about 30%;
has an average viscosity of greater than 10 seconds to less than 30 seconds using Ford Viscosity Cup #4 at 25° C.;
is substantially free of acrylamide-type monomers;
is substantially free of halogenated monomers, whether free or polymerized; and
is substantially free of structural units derived from bisphenol A, bisphenol F, bisphenol S, and any diepoxides thereof.

20. The coating composition of claim 4, wherein the latex copolymer constitutes greater than about 80% by weight of the coating composition, and wherein the coating composition:
has a total solids weight of greater than about 10% to less than about 30%;
has an average viscosity of greater than 10 seconds to less than 30 seconds using Ford Viscosity Cup #4 at 25° C.;
is substantially free of acrylamide-type monomers;
is substantially free of halogenated monomers, whether free or polymerized; and
is substantially free of structural units derived from bisphenol A, bisphenol F, bisphenol S, and any diepoxides thereof.

21. The coating composition of claim 4, wherein the one or more multi-unsaturated (meth) acrylate monomers comprise ethanediol di (meth) acrylate, propanediol di (meth) acrylate, butanediol di (meth) acrylate, heptanediol di (meth) acrylate, hexanediol di (meth) acrylate, trimethylolethane tri (meth) acrylate, trimethylolpropane tri (meth) acrylate, trimethylolbutane tri (meth) acrylate, trimethylolheptane tri (meth) acrylate, trimethylolhexane tri (meth) acrylate, tetramethylol methane tetra (meth) acrylate, dipropylene glycol di (meth) acrylate, trimethylol hexane tri (meth) acrylate, pentaerythritol tetra (meth) acrylate, isosorbide di (meth) acrylate, allyl (meth) acrylate, glycerol dimethacrylate, or a mixture thereof.

22. The coating composition of claim 4, wherein the concentration of the one or more multi-unsaturated monomers ranges from 11% by weight to 25% by weight, based on the total weight of the monomers used to produce the emulsion-polymerized latex copolymer.

23. An inside spray coating composition comprising:
an aqueous carrier comprising at least about 5% by weight of organic solvent; and
greater than about 65 weight percent, based on the entire weight of the total resin solids in the coating composition, of an emulsion-polymerized latex copolymer comprising:
a plurality of mono-unsaturated monomers each having a single ethylenically-unsaturated group; and
one or more multi-unsaturated monomers each having two or more ethylenically-unsaturated groups, wherein the multi-unsaturated monomer(s) each have a divalent chain length with at least two carbon atoms between at least two of the ethylenically-unsaturated groups, and constitute from greater than 5% by weight to 25% by weight of the monomers used to produce the emulsion-polymerized latex copolymer;
wherein one or more (meth) acrylate monomers comprise at least about 30% by weight of the monomers used to produce the emulsion-polymerized latex copolymer;
wherein:
the coating composition is substantially free of halogenated compounds;
the coating composition has a total solids weight of greater than about 10% to less than about 30%;
a coating formed from the coating composition has a glass transition temperature greater than about 50° C. and exhibits a metal exposure of less than 3.5 milliamps, pursuant to the Metal Exposure After Drop Damage test and a global extraction of less than 50 parts-per-million, pursuant to the Global Extraction test;

wherein the coating composition comprises a curing agent, wherein the curing agent is a crosslinker, which is present in an amount of up to 15% by weight, based on the total resin solids weight of the coating composition; and wherein the inside spray coating composition is an inside beverage container coating composition.

24. The coating composition of claim 23, wherein the coating composition is substantially free of formaldehyde and formaldehyde-containing compounds.

25. The coating composition of claim 23, wherein the emulsion-polymerized latex copolymer is emulsion polymerized in the presence of a polymeric surfactant comprising an acrylic polymer, an epoxy polymer, a polyester polymer, a polyolefin polymer, or a copolymer or mixture thereof.

26. The coating composition of claim 23, wherein the coating composition includes no more than 3 wt-% of oils and oil-based materials.

27. The coating composition of claim 23, wherein the curing agent is a phenoplast, a blocked isocyanate, an aminoplast, or a combination thereof.

28. An inside spray coating composition comprising:
  an aqueous carrier; and
  greater than about 65 weight percent, based on the entire weight of the total resin solids in the coating composition, of an emulsion-polymerized latex copolymer comprising:
    one or more mono-unsaturated monomers each having a single ethylenically-unsaturated group; and
    one or more multi-unsaturated monomers each having two or more ethylenically-unsaturated groups, wherein the multi-unsaturated monomer(s) each have a divalent chain length with at least two carbon atoms between at least two of the ethylenically-unsaturated groups, and constitute from greater than 5% by weight to 25% by weight of the monomers used to produce the emulsion-polymerized latex copolymer;

wherein:
  the coating composition is substantially free of halogenated compounds;
  the coating composition is substantially free of formaldehyde and formaldehyde-containing compounds;
  the average viscosity of the coating composition ranges from about 5 seconds to about 40 seconds using a Ford Viscosity Cup #4 at 25° C.;
  a coating formed from the coating composition has a glass transition temperature greater than about 50° C. and exhibits a metal exposure of less than 3.5 milliamps, pursuant to the Metal Exposure After Drop Damage test and a global extraction of less than 50 parts-per-million, pursuant to the Global Extraction test;
  the coating composition comprises a curing agent, wherein the curing agent is a crosslinker, which is present in an amount of up to 15% by weight, based on the total resin solids weight of the coating composition; and
  the inside spray coating composition is an inside beverage container coating composition.

29. The coating composition of claim 28, wherein the coating composition is substantially free of styrene, whether free or polymerized.

30. The coating composition of claim 28, wherein the one or more mono-unsaturated monomers comprise one or more polymerizable surfactants.

31. The coating composition of claim 28, wherein the coating composition includes no more than 3 wt-% of oils and oil-based materials.

32. The coating composition of claim 28, wherein the curing agent is a phenoplast, a blocked isocyanate, an aminoplast, or a combination thereof.

* * * * *